(12) United States Patent
Morikawa

(10) Patent No.: US 10,753,320 B2
(45) Date of Patent: *Aug. 25, 2020

(54) TUBULAR AIR CLEANER FOR INTERNAL COMBUSTION ENGINE

(71) Applicant: TOYOTA BOSHOKU KABUSHIKI KAISHA, Aichi-ken (JP)

(72) Inventor: Hiroaki Morikawa, Kitanagoya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 157 days.

This patent is subject to a terminal disclaimer.

(21) Appl. No.: 15/819,615

(22) Filed: Nov. 21, 2017

(65) Prior Publication Data

US 2018/0149119 A1 May 31, 2018

(30) Foreign Application Priority Data

Nov. 30, 2016 (JP) ................................ 2016-233021

(51) Int. Cl.
*F02M 35/024* (2006.01)
*B01D 46/00* (2006.01)
(Continued)

(52) U.S. Cl.
CPC ..... *F02M 35/02416* (2013.01); *B01D 46/0002* (2013.01); *B01D 46/0023* (2013.01);
(Continued)

(58) Field of Classification Search
CPC ............ B01D 53/0415; B01D 46/2411; B01D 46/521; B01D 53/0407; B01D 46/0036;
(Continued)

(56) References Cited

U.S. PATENT DOCUMENTS

| 3,873,287 A | * | 3/1975 | Barnebey | ........... B01D 46/0013 96/129 |
| 2006/0107836 A1 | * | 5/2006 | Maier | ................ B01D 46/0024 96/134 |

(Continued)

FOREIGN PATENT DOCUMENTS

| JP | 59-54740 U | 4/1984 |
| JP | 2001-123897 | 5/2001 |
| JP | 2005-194952 A | 7/2005 |

OTHER PUBLICATIONS

Office Action issued in China Counterpart Patent Appl. No. 201711202299.9, dated Aug. 2, 2019, along with an English translation thereof.

(Continued)

*Primary Examiner* — Minh Chau T Pham
(74) *Attorney, Agent, or Firm* — Greenblum & Bernstein, P.L.C.

(57) ABSTRACT

A tubular air cleaner for an internal combustion engine includes a tubular housing, a tubular filter element, and a planar adsorbent filter. The tubular housing includes a circumferential wall including an inlet, a top wall including an outlet, and a bottom wall opposed to the top wall. The tubular filter element is accommodated in the housing. The planar adsorbent filter is located at an inner side of the filter element to adsorb evaporated fuel of the internal combustion engine. The adsorbent filter extends in an axial direction of the filter element. The filter element includes an inner surface spaced apart from each of opposite planes of the adsorbent filter by a gap that allows air to reach the outlet without passing through the adsorbent filter.

6 Claims, 21 Drawing Sheets

(51) Int. Cl.
*B01D 46/24* (2006.01)
*B01D 46/10* (2006.01)
*B01D 46/44* (2006.01)
*B01D 46/52* (2006.01)
*F02M 35/02* (2006.01)
*F02M 35/10* (2006.01)

(52) U.S. Cl.
CPC ......... *B01D 46/0036* (2013.01); *B01D 46/10* (2013.01); *B01D 46/2411* (2013.01); *B01D 46/444* (2013.01); *B01D 46/521* (2013.01); *F02M 35/0218* (2013.01); *F02M 35/02483* (2013.01); *F02M 35/02491* (2013.01); *F02M 35/10386* (2013.01); *B01D 2265/06* (2013.01); *B01D 2279/60* (2013.01)

(58) Field of Classification Search
CPC ............ B01D 2259/45; B01D 2279/60; B01D 2253/102; F02M 35/0201; F02M 35/02483; F02M 25/0854; F02M 25/089
USPC ......... 55/385.3, 498, 502, 497, 521; 96/147, 96/148; 123/198 E
See application file for complete search history.

(56) References Cited

U.S. PATENT DOCUMENTS

| 2006/0272509 | A1  | 12/2006 | Uemura et al. |             |
|--------------|-----|---------|---------------|-------------|
| 2018/0147525 | A1* | 5/2018  | Morikawa      | B01D 46/2411|
| 2018/0149117 | A1* | 5/2018  | Morikawa      | B01D 46/2411|
| 2018/0149118 | A1* | 5/2018  | Morikawa      | B01D 46/2411|

OTHER PUBLICATIONS

Office Action issued in Japanese Patent Application No. 2016-233021, dated May 19, 2020.

* cited by examiner

TUBULAR AIR CLEANER FOR INTERNAL COMBUSTION ENGINE

BACKGROUND ART

The present invention relates to a tubular air cleaner arranged in an intake air passage of an internal combustion engine.

A prior art tubular air cleaner for an internal combustion engine includes a tubular housing and a tubular filter element. The housing includes a circumferential wall including an inlet, a top wall including an outlet, and a bottom wall opposed to the top wall. The filter element is accommodated in the housing.

The tubular filter element includes a pleated tubular filter portion, which is formed by pleating a filter medium sheet, and two sealing portions, which are arranged on opposite ends of the filter portion in an axial direction to seal the space between the top wall and the bottom wall of the housing.

Japanese Laid-Open Patent Publication No. 2001-123897 discloses a filter element that includes a filter portion and an inner tube, which is located at an inner side of the filter portion. The inner tube includes an adsorbent, which adsorbs evaporated fuel, and has a number of air holes.

SUMMARY OF THE INVENTION

The filter element described in Japanese Laid-Open Patent Publication No. 2001-123897 has the drawback of increasing the airflow resistance. The reason is that although the inner tube has a number of air holes, the inner tube blocks a passage through which the air flows. Therefore, there is room for improvement to reduce the air pressure loss.

It is an object of the present invention to provide a tubular air cleaner for an internal combustion engine that reduces air pressure loss.

To achieve the above object, a tubular air cleaner arranged in an intake air passage of an internal combustion engine includes a tubular housing, a tubular filter element, and a planar adsorbent filter. The tubular housing includes a circumferential wall including an inlet, a top wall including an outlet, and a bottom wall opposed to the top wall. The tubular filter element is accommodated in the housing. The planar adsorbent filter is located at an inner side of the filter element to adsorb evaporated fuel of the internal combustion engine. The adsorbent filter extends in an axial direction of the filter element. The filter element includes an inner surface spaced apart from each of opposite planes of the adsorbent filter by a gap that allows air to reach the outlet without passing through the adsorbent filter.

With this structure, when air flows through the filter element into the inner side of the filter element, the air is allowed to reach the outlet without passing through the adsorbent filter. Thus, when air flows through the inner side of the filter element, an increase in the flow resistance caused by the adsorbent filter will be limited. Consequently, the air pressure loss is reduced.

DESCRIPTION OF THE EMBODIMENTS

First Embodiment

A first embodiment will now be described with reference to FIGS. 1 to 4.

Figure 1:
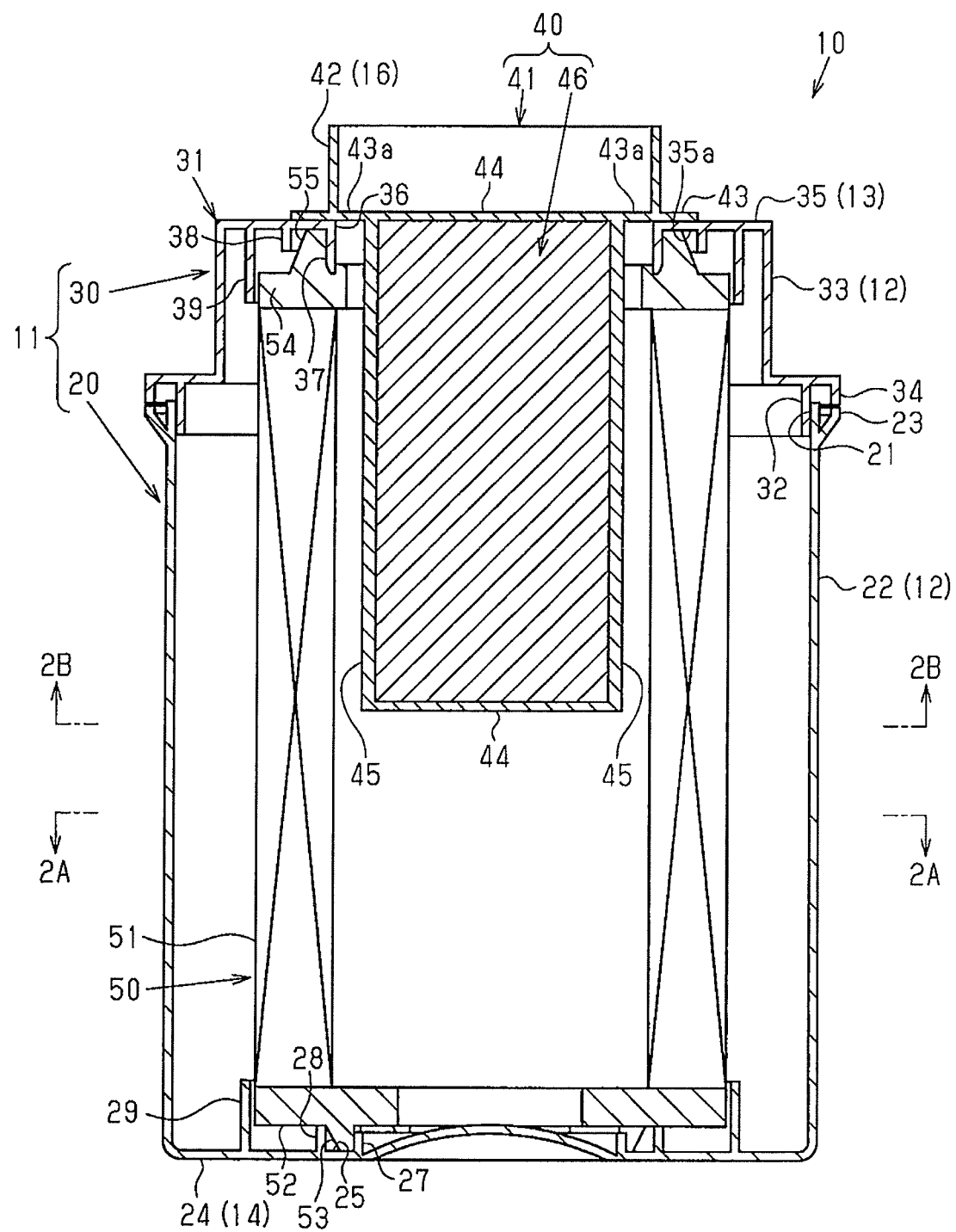
FIG. 1 is a vertical cross-sectional view showing a first embodiment of a tubular air cleaner.
Figure 2A:
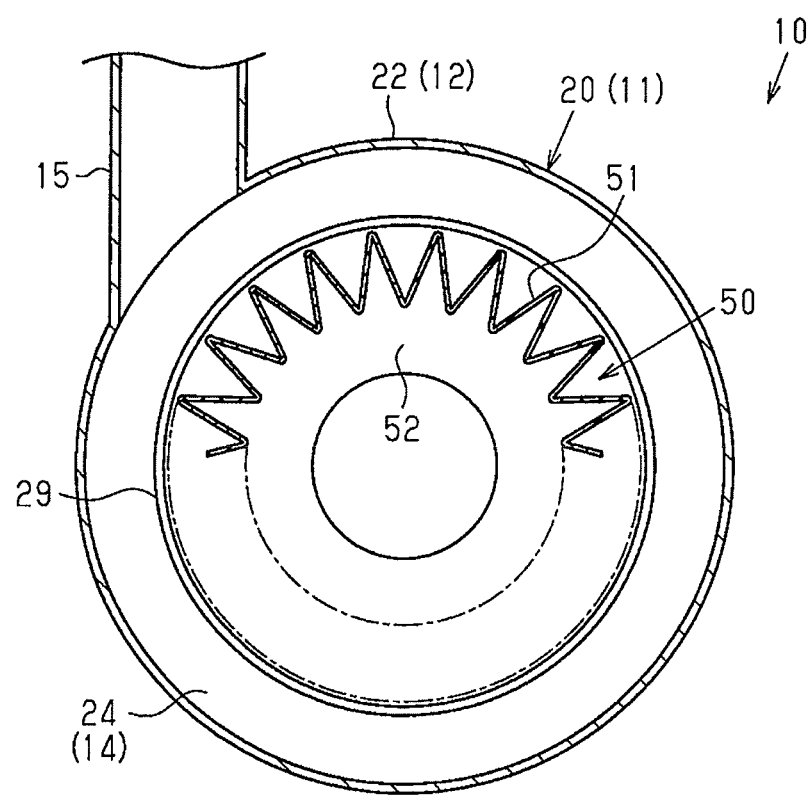
FIG. 2A is a cross-sectional view taken along line 2A-2A in FIG. 1.
Figure 2B:
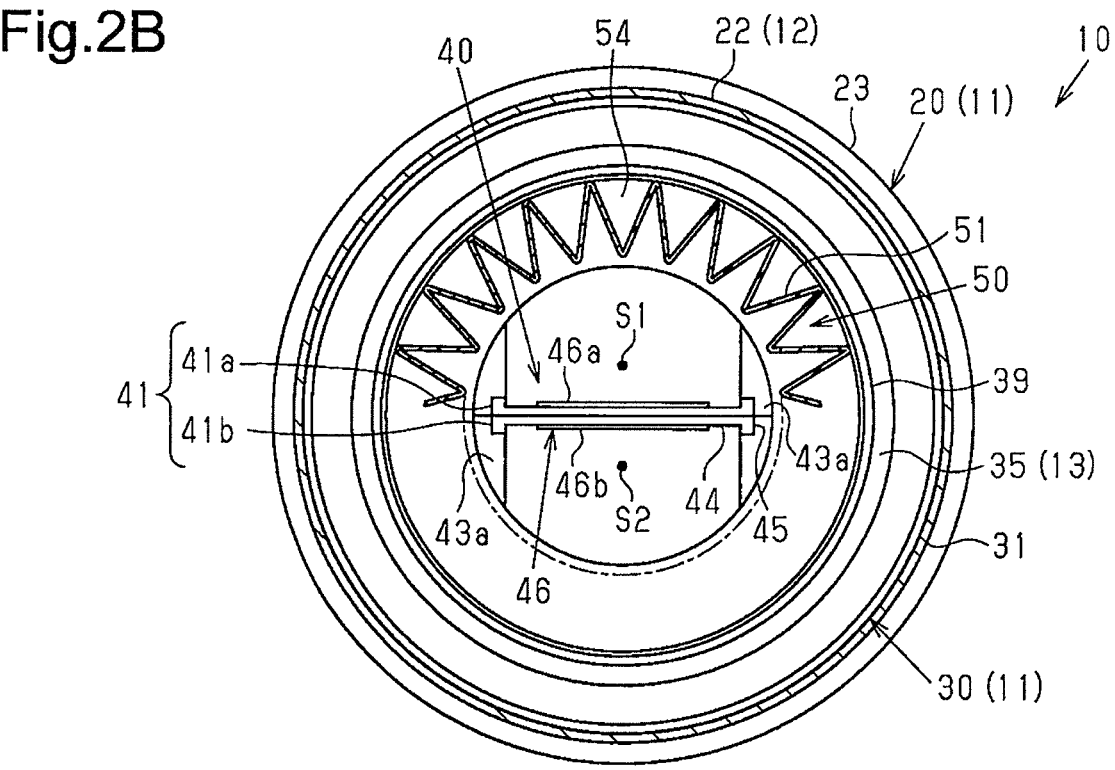
FIG. 2B is a cross-sectional view taken along line 2B-2B in FIG. 1.

As shown in FIGS. 1, 2A, and 2B, a tubular air cleaner (hereafter, referred to as air cleaner 10) is arranged in an intake air passage of the internal combustion engine and includes a tubular housing 11. The tubular housing 11 includes a circumferential wall 12 including an inlet 15, a top wall 13 including an outlet 16, and a bottom wall 14 opposed to the top wall 13. A tubular filter element 50 is accommodated in the housing 11.

Filter Element 50

As shown in FIGS. 1, 2A, and 2B, the filter element 50 includes a pleated tubular filter portion 51, which is formed by pleating a filter medium sheet such as a non-woven cloth or filter paper, a first sealing portion 52, and a second sealing portion 54, each of which is discoid and has a center hole. The first sealing portion 52 and the second sealing portion 54 are located on one end and another end of the filter portion 51 in an axial direction.

As shown in FIG. 1, the first sealing portion 52 has an end surface that is formed integrally with a plurality of projections 53 arranged at intervals in the circumferential direction. The second sealing portion 54 has an end surface that is formed integrally with an annular projection 55.

Housing 11

The housing 11 includes a case 20, which includes a portion of the circumferential wall 12 and the bottom wall 14, and a cap 30, which includes a portion of the circumferential wall 12 and the top wall 13 and is coupled to the case 20 in a removable manner.

The case 20 and the cap 30 will now be described in detail.

Case 20

As shown in FIGS. 1, 2A, and 2B, the case 20 includes a tubular case circumferential wall 22, which extends around an opening 21. A case flange 23 is formed in the entire circumferential edge of the case 20 defining the opening 21.

As shown in FIGS. 1 and 2A, the case 20 includes a case bottom wall 24, which defines the bottom wall 14 of the housing 11, and the tubular inlet 15, which projects from an outer surface of the case circumferential wall 22 and communicates the inside of the case 20 to the outside of the case 20.

As shown in FIG. 1, the inner surface of the case bottom wall 24 includes an inner projection 27, an intermediate projection 28, and an outer projection 29, which are annular and concentric with each other about the axis of the case 20. The inner surface of the case bottom wall 24, the outer circumferential surface of the inner projection 27, and the inner circumferential surface of the intermediate projection 28 define an annular recess 25. The projections 53 of the first sealing portion 52 of the filter element 50 are fitted into the recess 25. Each projection 53 includes an end surface that contacts the inner surface of the case bottom wall 24 in the recess 25. This seals the space between the case 20 and the first sealing portion 52.

The projection amount of the outer projection 29 toward the opening 21 is greater than the projection amount of each of the inner projection 27 and the intermediate projection 28 toward the opening 21. The inner circumferential surface of the outer projection 29 is spaced apart from and opposed to the outer circumferential surface of the first sealing portion 52 in the radial direction.

The case 20 is formed from a rigid resin material.

Cap 30

As shown in FIGS. 1 and 2B, the cap 30 includes a cap body 31 and an adsorbent filter assembly 40.

As shown in FIG. 1, a cap body 31 includes a tubular cap circumferential wall 33 extending around an opening 32. A cap flange 34 is formed in the entire circumferential edge of the cap circumferential wall 33.

The cap body 31 includes a cap top wall 35, which includes a through hole 36 and defines the top wall 13 of the housing 11.

The inner surface of the cap top wall 35 includes an inner projection 37, an intermediate projection 38, and an outer projection 39, which are annular and concentric with each other about the axis of the cap body 31. In the first embodiment, the inner circumferential surface of the inner projection 37 defines the through hole 36. The inner surface of the cap top wall 35, the outer circumferential surface of the inner projection 37, and the inner circumferential surface of the intermediate projection 38 define an annular recess 35a. The annular projection 55 of the second sealing portion 54 of the filter element 50 is fitted into the recess 35a. The annular projection 55 includes an end surface that contacts an inner surface (hereafter, may be referred to as sealing surface) of the cap top wall 35 to seal the space between the cap 30 and the second sealing portion 54.

The projection amount of the outer projection 39 toward the opening 32 is greater than the projection amount of each of the inner projection 37 and the intermediate projection 38 toward the opening 32. The inner circumferential surface of the outer projection 39 is spaced apart from and opposed to the outer circumferential surface of the second sealing portion 54 in the radial direction.

The cap body 31 is formed from a rigid resin material.

Figure 3:
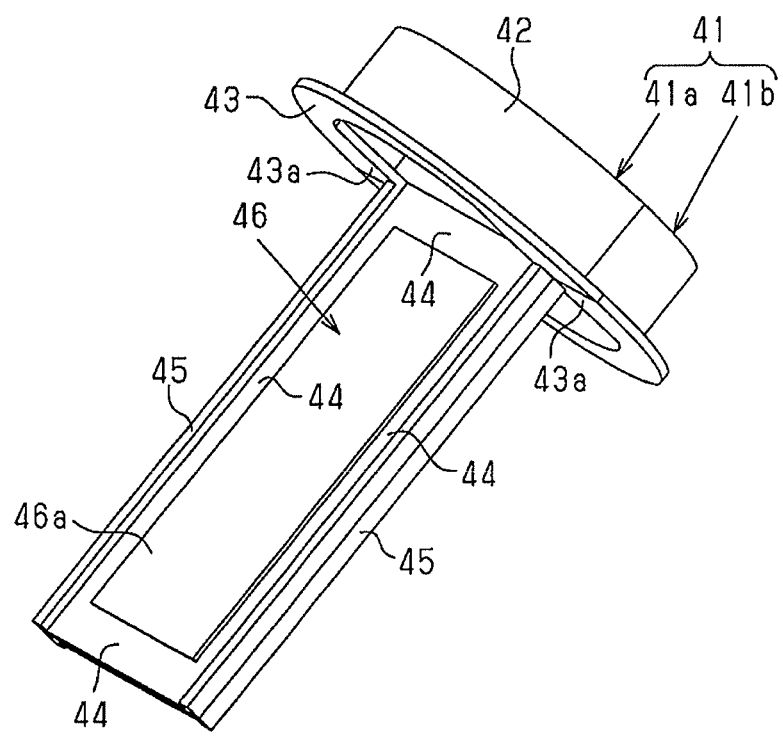
FIG. 3 is a perspective view showing an adsorbent filter assembly of the first embodiment.
Figure 4:
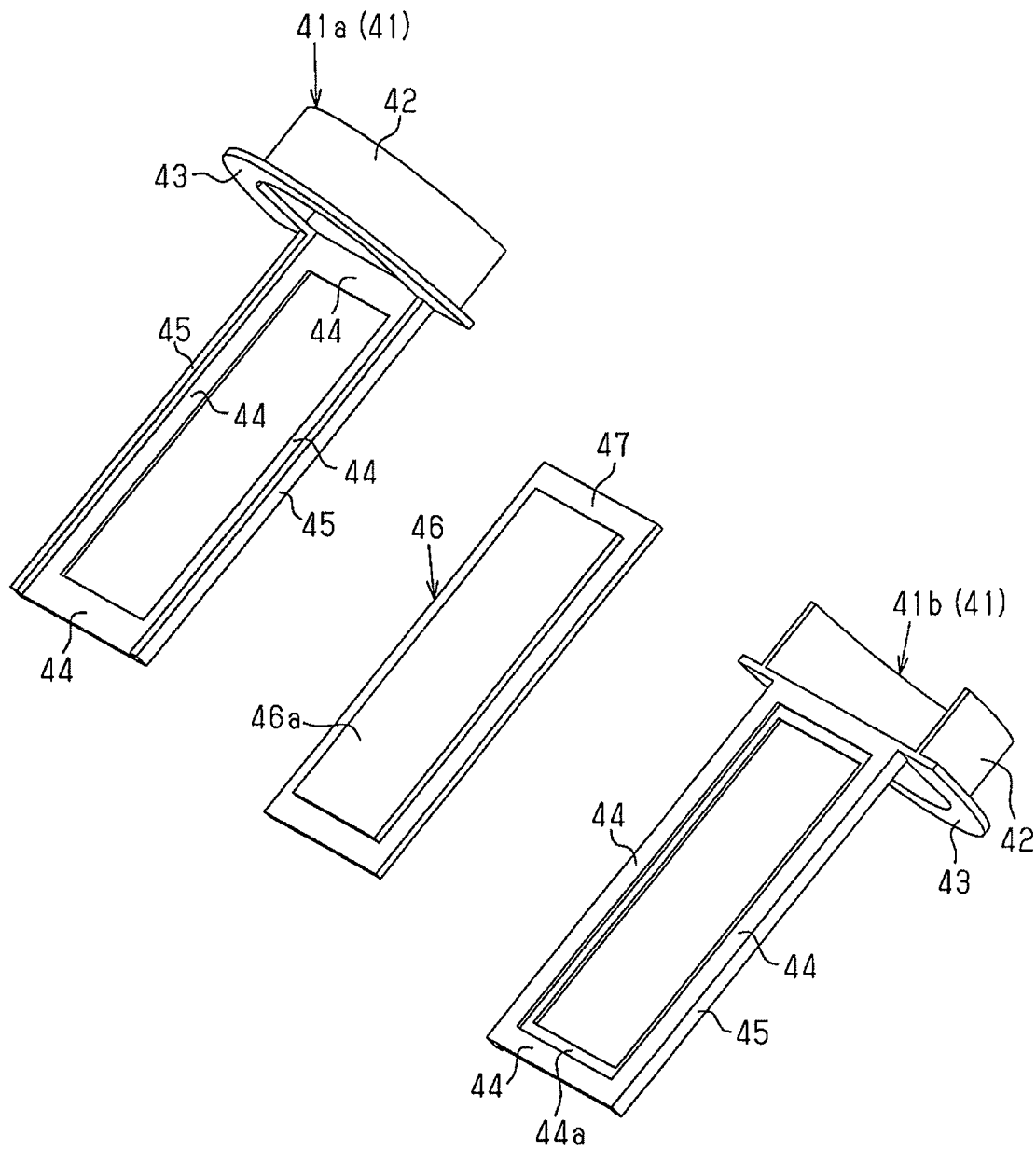
FIG. 4 is an exploded perspective view separately showing a first half body, a second half body, and an adsorbent filter that form the adsorbent filter assembly of the first embodiment.

As shown in FIGS. 1, 3, and 4, the adsorbent filter assembly 40 includes an adsorbent filter 46, which adsorbs evaporated fuel of the internal combustion engine, and a holding member 41, which holds the adsorbent filter 46 and is fixed to the cap body 31.

Although not shown in the drawings, the adsorbent filter 46 has the form of a rectangular plate and includes an adsorbent layer formed from activated carbon particles, two non-woven sheets holding the adsorbent layer in between, two glass fiber nets holding the two non-woven sheets in between, and two resin nets holding the two glass fiber nets in between. The entire periphery of the adsorbent filter 46 is thermally compressed defining a peripheral edge portion 47.

As shown in FIGS. 1 and 3, the holding member 41 includes a tubular portion 42 defining the outlet 16 and a substantially annular fixing portion 43, which entirely projects from the basal end of the tubular portion 42 toward a circumferentially outer side.

As shown in FIGS. 1, 2B, and 3, the fixing portion 43 includes two opposing parts 43a, which inwardly project so as to be opposed to each other, and a looped rectangular frame 44, which connects the opposing parts 43a. The frame 44 projects away from the tubular portion 42.

The outer periphery of the frame 44 includes two pillars 45, which extend in an axial direction of the filter element 50. In the first embodiment, the width of each pillar 45 is fixed in an extension direction of the pillar 45.

As shown in FIG. 4, the holding member 41 of the first embodiment includes a first half body 41a and a second half body 41b, which are formed separately from each other from a rigid resin material. The half bodies 41a, 41b have surfaces opposed to each other, each of which includes an accommodation portion 44a. The accommodation portion 44a entirely extends around the inner periphery of the corresponding one of the half bodies 41a, 41b to accommodate the peripheral edge portion 47 of the adsorbent filter 46.

With the peripheral edge portion 47 of the adsorbent filter 46 held between the accommodation portions 44a of the half bodies 41a, 41b, the half bodies 41a, 41b are bonded to each other, for example, through vibration welding. This forms the adsorbent filter assembly 40.

As shown in FIG. 1, when the frame 44 and the adsorbent filter 46 of the adsorbent filter assembly 40 are inserted through the through hole 36 of the cap body 31 into the cap 30 from the outside, the circumference of the fixing portion 43 is entirely fixed to the outer surface of the cap top wall 35. The fixing portion 43 and the cap top wall 35 are bonded to each other, for example, through vibration welding.

As shown in FIGS. 1 and 2B, the adsorbent filter 46 extends through the axis of the filter element 50 in the axial direction of the filter element 50.

As shown in FIG. 2B, the adsorbent filter 46 includes opposite planes 46a, 46b, which are spaced apart from the inner surfaces of the filter portion 51 and the second sealing portion 54 of the filter element 50 by gaps S1, S2. The gaps S1, S2 allow air to reach the outlet 16 without passing through the adsorbent filter 46.

The first embodiment of the tubular air cleaner for an internal combustion engine has the advantages described below.

(1) The tubular air cleaner includes the planar adsorbent filter 46, which is located at the inner side of the filter element 50 to adsorb evaporated fuel of the internal combustion engine. The adsorbent filter 46 extends in the axial direction of the filter element 50. The inner surface of the filter element 50 is spaced apart from the opposite planes 46a, 46b of the adsorbent filter 46 by the gaps S1, S2 that allow air to reach the outlet 16 without passing through the adsorbent filter 46.

With this structure, when air flows through the filter portion 51 of the filter element 50 into the inner side of the filter element 50, the air is allowed to reach the outlet 16 without passing through the adsorbent filter 46. Thus, when air flows through the inner side of the filter element 50, an increase in the flow resistance caused by the adsorbent filter 46 will be limited. Consequently, the air pressure loss is reduced.

(2) The housing 11 includes the case 20, which includes the bottom wall 14, and the cap 30, which includes the top wall 13 and is coupled to the case 20 in a removable manner.

The cap 30 includes the cap body 31, which includes the cap top wall 35 including the through hole 36, and the adsorbent filter assembly 40. The adsorbent filter assembly 40 includes the tubular portion 42 defining the outlet 16, the adsorbent filter 46, and the fixing portion 43, which is formed integrally with the tubular portion 42 and the adsorbent filter 46. When the adsorbent filter 46 is inserted through the through hole 36, the fixing portion 43 is fixed to the cap top wall 35.

In this structure, the cap body 31, which includes the through hole 36, and the adsorbent filter assembly 40, which includes the tubular portion 42 defining the outlet 16, the adsorbent filter 46, and the fixing portion 43, are separately formed from each other. The cap 30 includes the cap body 31 and the adsorbent filter assembly 40. Thus, the same adsorbent filter assembly 40 may be used in internal combustion engines including the outlet 16 of the same diameter. This commonalizes the adsorbent filter assembly 40.

(3) The fixing portion 43 of the adsorbent filter assembly 40 is fixed to the outer surface of the cap top wall 35 of the cap body 31.

A conventional cap may include the outlet 16 and the top wall 13 formed integrally with each other. The outlet 16 and a portion including the outlet 16 may be removed from the conventional cap to form the cap body 31 including the through hole 36 so that the adsorbent filter assembly 40 can be fitted for the cap.

A conventional cap may be configured as in the air cleaner 10 in which the second sealing portion 54 of the filter element 50 is in contact with the inner surface of the top wall 13 of the cap 30 (inner surface in recess 35a).

With this structure, the fixing portion 43 is fixed to the outer surface of the cap top wall 35 of the cap body 31. Thus, the inner surface of the cap top wall 35 may have the same shape as the inner surface of the top wall 13 of a conventional cap. Therefore, while the conventional cap is used, the sealability is easily ensured in the space between the second sealing portion 54 of the filter element 50 and the inner surface of the top wall 13 of the cap 30.

(4) The fixing portion 43 is annular, and the circumference of the fixing portion 43 is entirely fixed to the cap top wall 35.

With this structure, the adsorbent filter assembly 40 is assuredly fixed to the cap body 31.

Second Embodiment

A second embodiment of an adsorbent filter assembly 40 will now be described focusing on the differences from the first embodiment with reference to FIG. 5.

Figure 5:
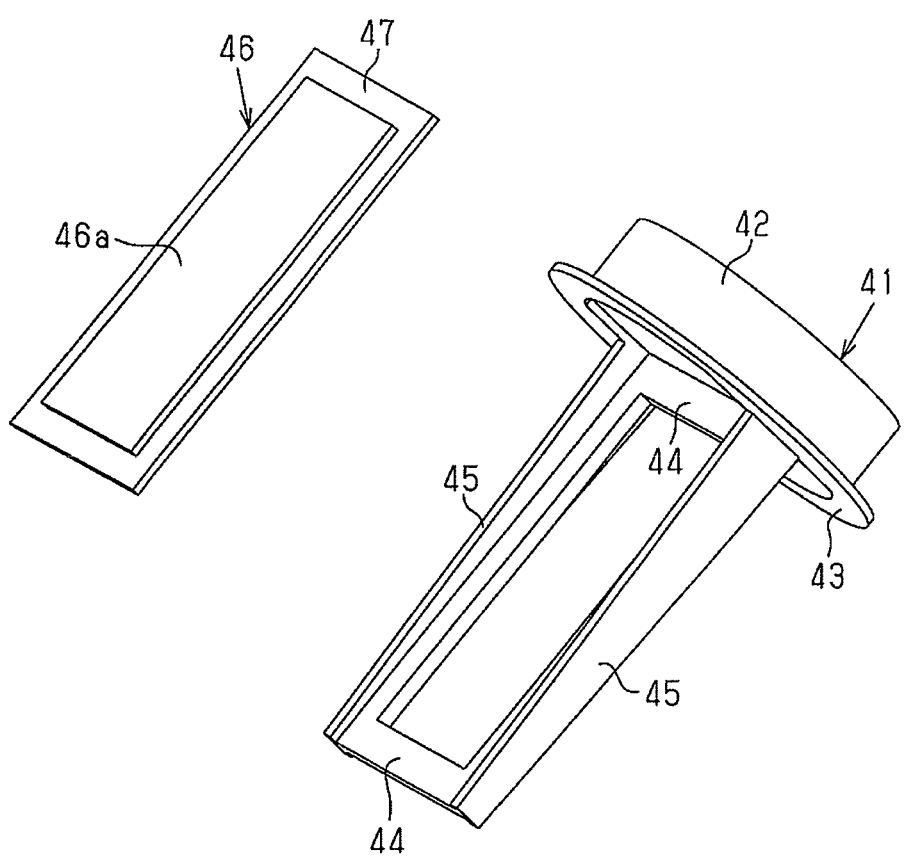
FIG. 5 is a perspective view showing a second embodiment of an adsorbent filter assembly.

As shown in FIG. 5, in the same manner as the first embodiment, the holding member 41 of the second embodiment includes the tubular portion 42, the fixing portion 43, the frame 44, and the two pillars 45. However, instead of the two half bodies 41a, 41b formed separately from each other, the holding member 41 of the second embodiment includes a single member. The width of each pillar 45 is tapered toward the distal side, which is distant from the fixing portion 43.

The peripheral edge portion 47 of the adsorbent filter 46 is bonded to an outer surface of the frame 44 to form the adsorbent filter assembly 40.

The second embodiment of the tubular air cleaner for an internal combustion engine has the advantages described below in addition to the advantages (1) through (4) of the first embodiment.

(5) The adsorbent filter assembly 40 includes the frame 44 arranged on the periphery of the adsorbent filter 46. The frame 44 includes the two pillars 45 extending in the axial direction of the filter element 50 and having a width tapered toward the distal side, which is distant from the fixing portion 43.

With this structure, the width of each pillar 45 is tapered toward the distal side. Thus, when the filter element 50 is fitted onto the adsorbent filter assembly 40, the interference with the pillars 45 is limited. This allows the filter element 50 to be easily coupled to the cap 30 to which the adsorbent filter assembly 40 is coupled.

Additionally, the pillars 45 are wider toward the basal side. This increases the rigidity of the pillars 45, and ultimately, the rigidity of the adsorbent filter 46.

Additionally, as compared to a structure in which the entire width of each pillar 45 is large and constant in conformance with the width of the basal side, the pillars 45 of the second embodiment reduce the disturbance of the flow of air flowing through the inner side of the filter element 50. Thus, the air pressure loss is reduced.

Third Embodiment

A third embodiment of an air cleaner 10 will now be described focusing on the differences from the first embodiment with reference to FIG. 6.

Figure 6:
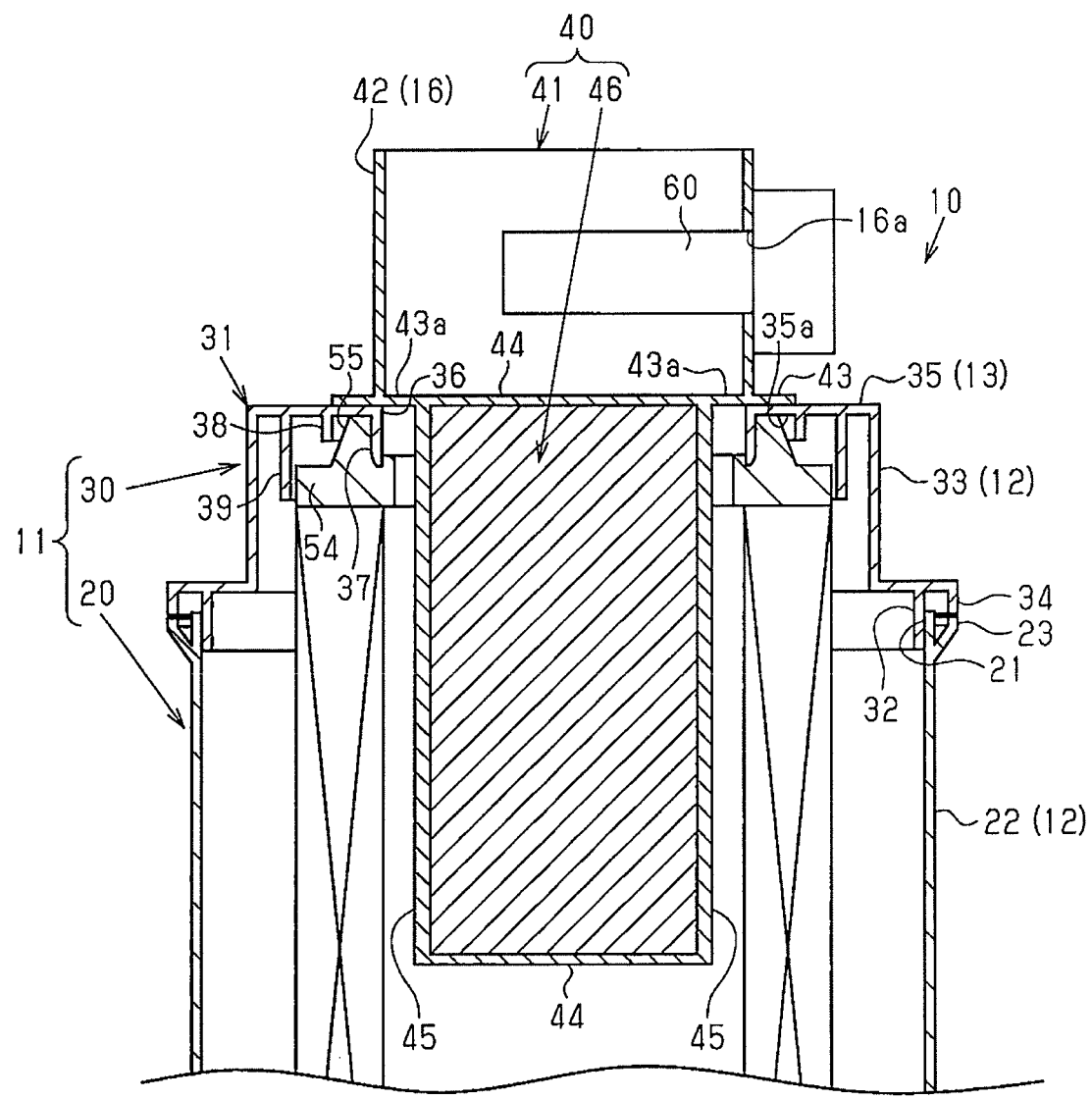
FIG. 6 is a cross-sectional view showing a third embodiment of a tubular air cleaner including a cross-sectional structure of an outlet.

As shown in FIG. 6, the outlet 16 includes an attachment slot 16a used for attachment of an airflow meter 60, which detects the intake air amount of the internal combustion engine.

In the third embodiment, the airflow meter 60 projects through the attachment slot 16a into the outlet 16. The adsorbent filter 46 is arranged parallel to the projection direction of the airflow meter 60.

The third embodiment of the tubular air cleaner for an internal combustion engine has the advantages described below in addition to the advantages (1) through (4) of the first embodiment.

(6) The adsorbent filter 46 is arranged parallel to the projection direction of the airflow meter 60, which projects through the attachment slot 16a into the outlet 16.

With this structure, when air that has passed through the gaps S1, S2, which are formed between the filter element 50 and the opposite planes 46a, 46b of the adsorbent filter 46, flows through the outlet 16, the air is subtly disturbed by the airflow meter 60, which projects into the outlet 16. This limits variations in detection values of the airflow meter 60.

Fourth Embodiment

A fourth embodiment will now be described with reference to FIGS. 7 to 10.

The fourth embodiment differs from the first embodiment in the structure of the cap 30. The case 20 of the fourth embodiment has the same structure as that of the first embodiment (refer to FIGS. 7 and 8A). Hereafter, the description will focus on the differences from the first embodiment. The same reference characters are given to those elements that are the same as or correspond to the first embodiment. Such elements will not be described in detail.

Cap 30

Figure 7:
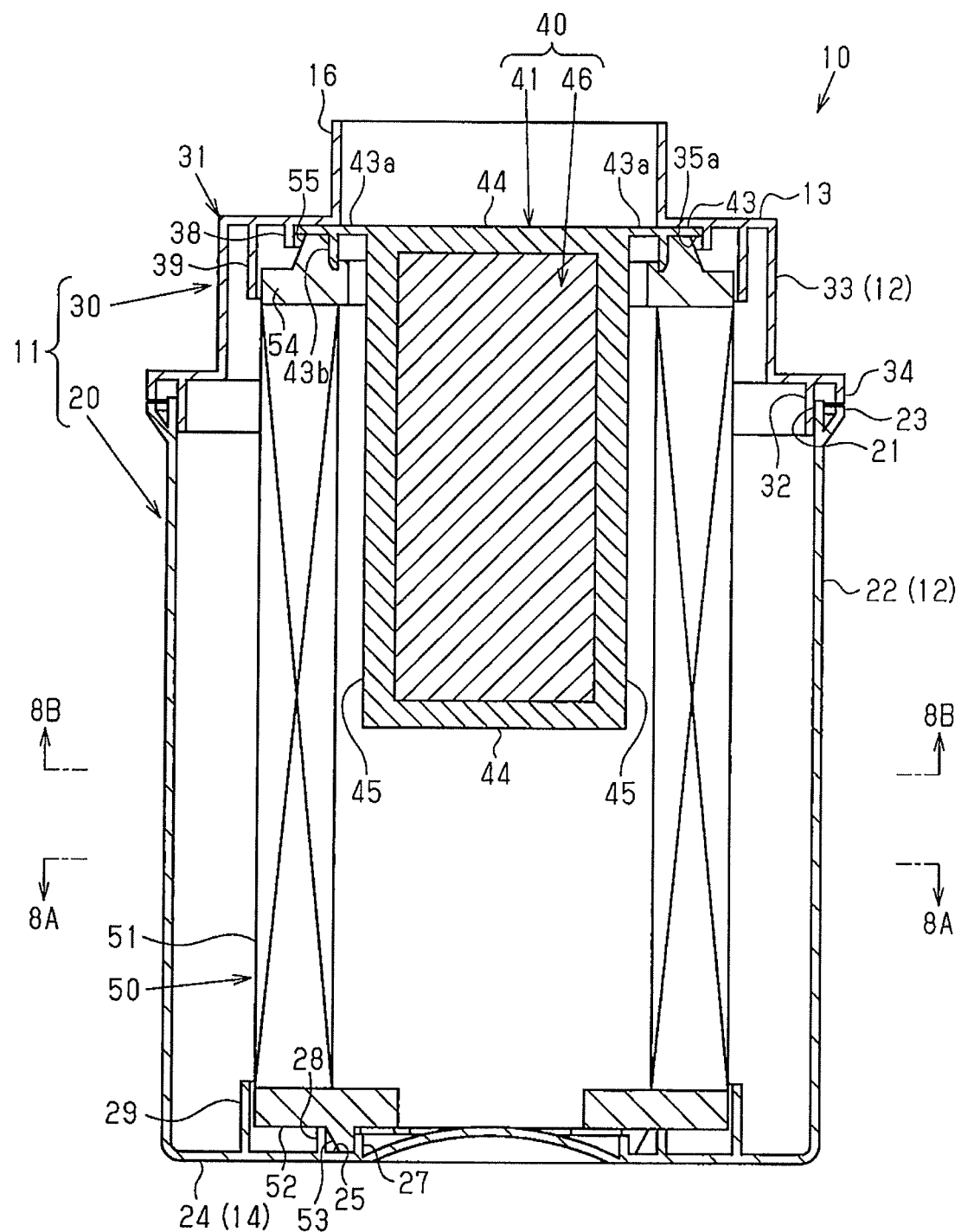
FIG. 7 is a vertical cross-sectional view showing a fourth embodiment of a tubular air cleaner.

As shown in FIG. 7, the cap body 31 includes a tubular cap circumferential wall 33, which extends around the opening 32, the top wall 13, and the tubular outlet 16, which projects from the outer surface of the top wall 13 and communicates the inside of the cap body 31 to the outside of the cap body 31.

Figure 9:
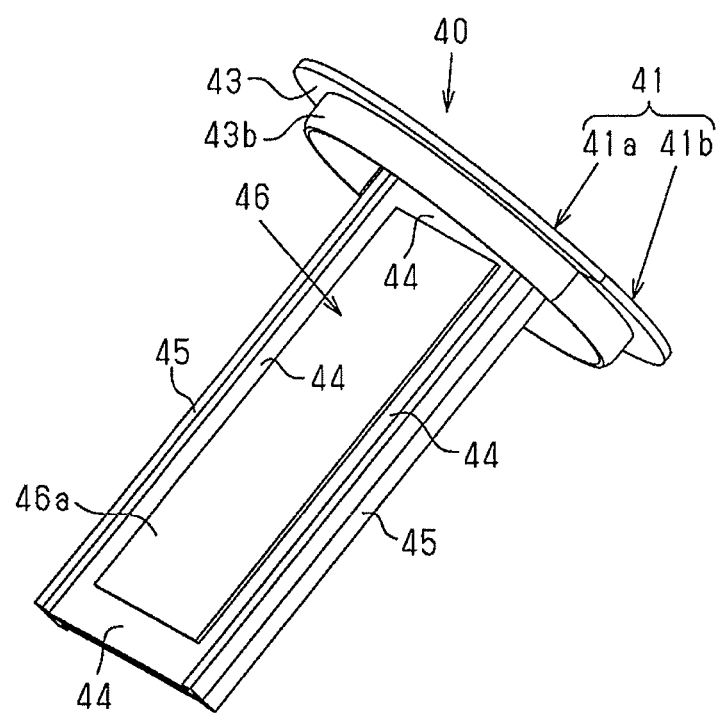
FIG. 9 is a perspective view showing an adsorbent filter assembly of the fourth embodiment.
Figure 10:
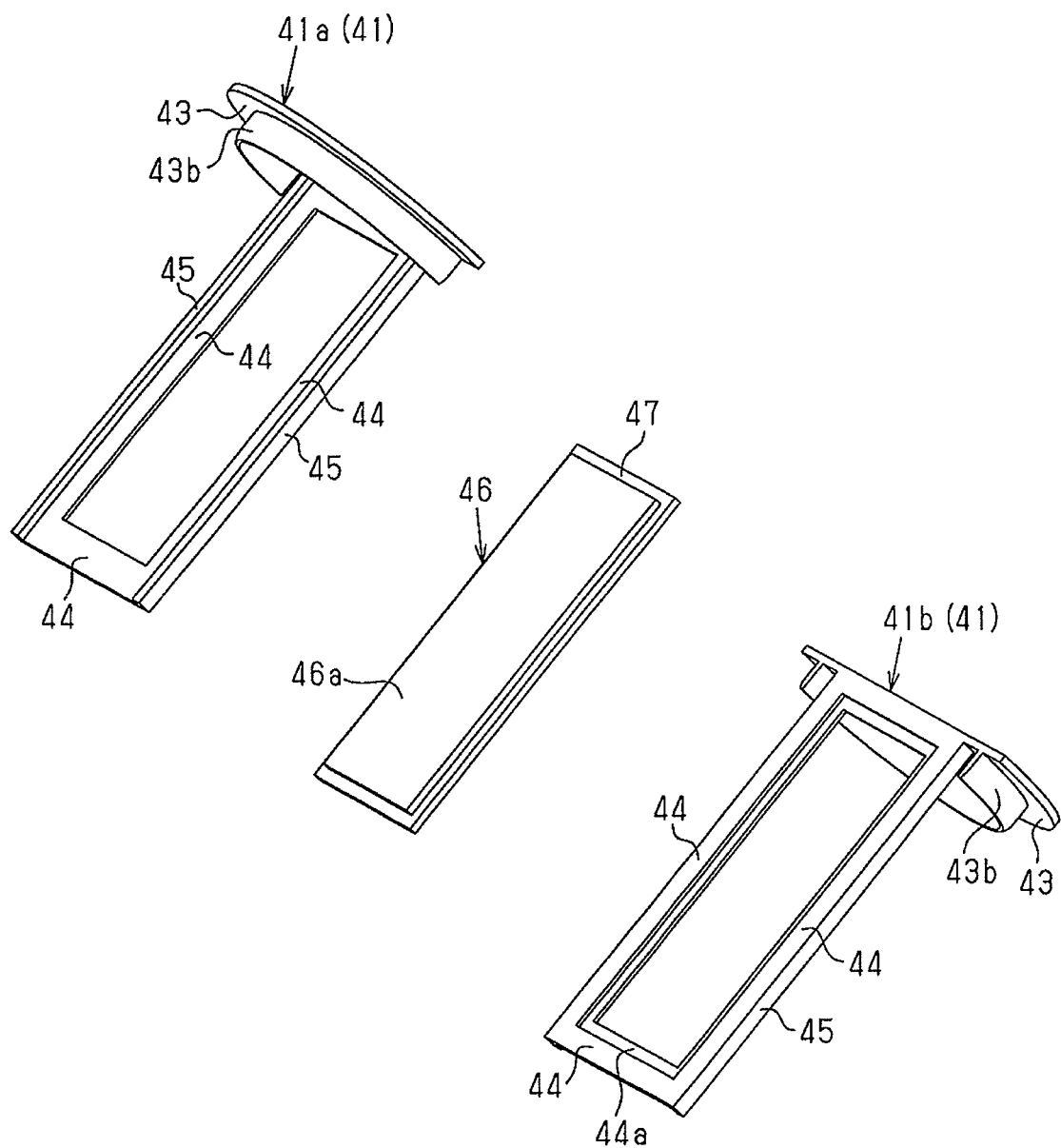
FIG. 10 is an exploded perspective view separately showing a first half body, a second half body, and an adsorbent filter that form the adsorbent filter assembly of the fourth embodiment.

As shown in FIGS. 7 and 9, the holding member 41 includes the substantially annular fixing portion 43. The outer diameter of the fixing portion 43 is set to be slightly smaller than the inner diameter of the intermediate projection 38. The inner surface of the fixing portion 43 includes an annular inner projection 43b.

As shown in FIG. 7, the circumference of the fixing portion 43 is entirely fixed to the inner surface of the top wall 13. The fixing portion 43 and the top wall 13 are bonded to each other, for example, through vibration welding.

The inner surface of the fixing portion 43, the outer circumferential surface of the inner projection 43b, and the inner circumferential surface of the intermediate projection 38 define an annular recess 35a. The annular projection 55 of the second sealing portion 54 of the filter element 50 is fitted into the recess 35a. The end surface of the annular projection 55 contacts an inner surface (hereafter, may be referred to as sealing surface) of the fixing portion 43 in the recess 35a. This seals the space between the cap 30 and the second sealing portion 54.

Figure 8A:
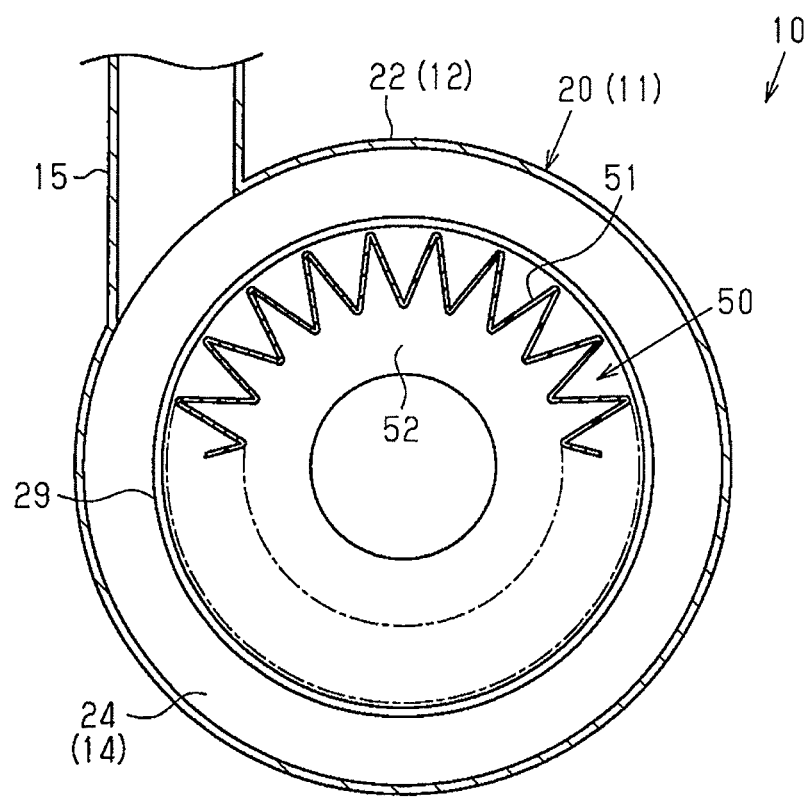
FIG. 8A is a cross-sectional view taken along line 8A-8A in FIG. 7.
Figure 8B:
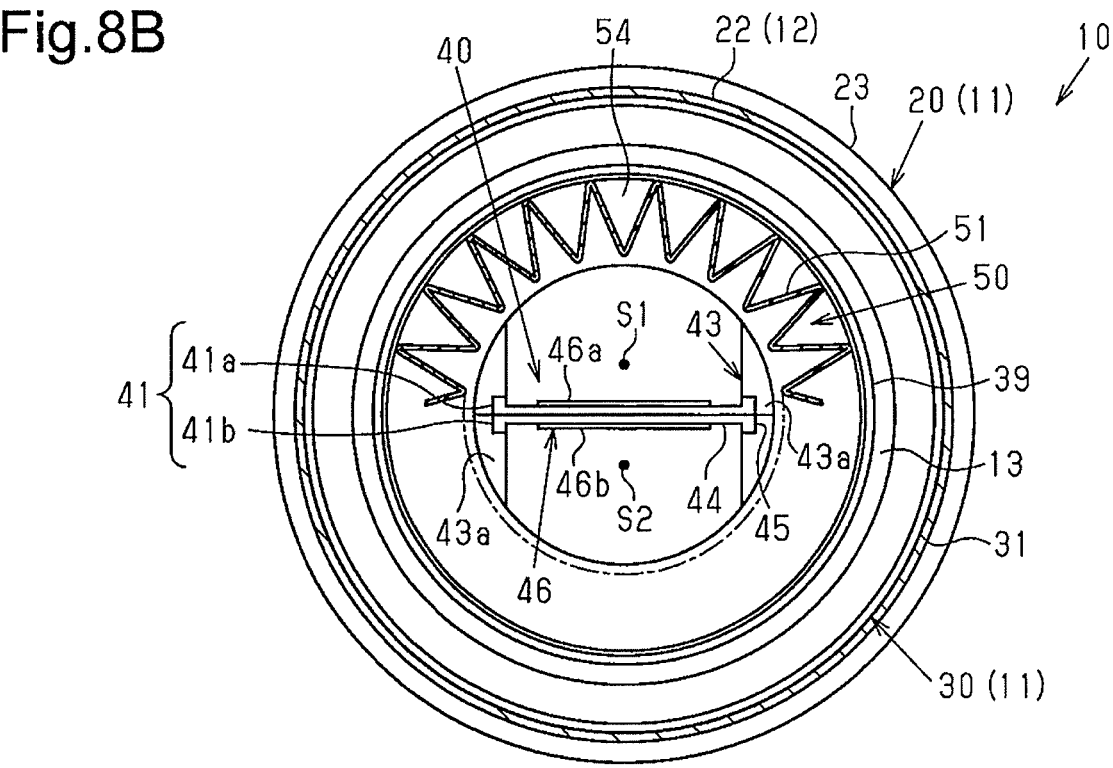
FIG. 8B is a cross-sectional view taken along line 8B-8B in FIG. 7.

As shown in FIG. 8B, the inner surfaces of the filter portion 51 and the second sealing portion 54 of the filter element 50 are spaced apart from the opposite planes 46a, 46b of the adsorbent filter 46 by the gaps S1, S2, which allow air to reach the outlet 16 without passing through the adsorbent filter 46.

The fourth embodiment of the tubular air cleaner for an internal combustion engine has the advantages described below in addition to the advantage (1) of the first embodiment.

(7) The housing 11 includes the case 20, which includes the bottom wall 14, and the cap 30, which includes the top wall 13 and is coupled to the case 20 in a removable manner. The cap 30 includes the cap body 31, which includes the top wall 13 and the outlet 16, and the adsorbent filter assembly 40, which includes the adsorbent filter 46 and the fixing portion 43. The fixing portion 43 is formed integrally with the adsorbent filter 46 and is fixed to the inner surface of the top wall 13.

In this structure, the adsorbent filter assembly 40 includes the adsorbent filter 46 and the fixing portion 43, and the cap body 31 includes the outlet 16. Thus, when the air cleaner 10 is destined for a location that requires the adsorbent filter 46, the cap body 31 to which the adsorbent filter assembly 40 is coupled to is used as the cap. When the air cleaner 10 is destined for a location that does not require the adsorbent filter 46, the adsorbent filter assembly 40 is not coupled to the cap body 31. That is, only the cap body 31 may be used as the cap. This simplifies the structure of the adsorbent filter assembly 40. Also, the cap body 31 is commonalized regardless of whether or not the adsorbent filter 46 is coupled to.

(8) The fixing portion 43 is annular, and the circumference of the fixing portion 43 is entirely fixed to the inner surface of the top wall 13.

With this structure, the adsorbent filter assembly 40 is assuredly fixed to the cap body 31.

Fifth Embodiment

A fifth embodiment of an adsorbent filter assembly 40 will now be described focusing on the differences from the fourth embodiment with reference to FIG. 11.

Figure 11:
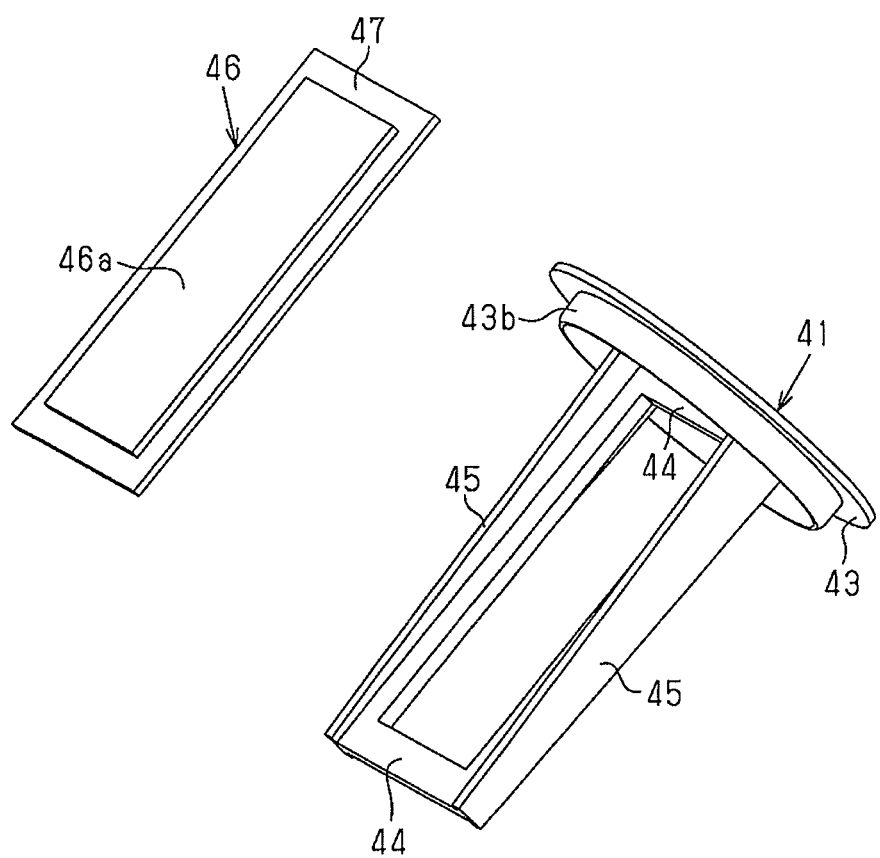
FIG. 11 is an exploded perspective view separately showing a holding member and an adsorbent filter that form a fifth embodiment of an adsorbent filter assembly.

As shown in FIG. 11, in the same manner as the fourth embodiment, the holding member 41 of the fifth embodiment includes the fixing portion 43, the frame 44, and the two pillars 45. However, instead of the two half bodies 41a, 41b formed separately from each other, the holding member 41 of the fifth embodiment includes a single member. Additionally, the width of each pillar 45 is tapered toward the distal side, which is distant from the fixing portion 43.

The peripheral edge portion 47 of the adsorbent filter 46 is bonded to an outer surface of the frame 44 to form the adsorbent filter assembly 40.

The fifth embodiment of the tubular air cleaner for an internal combustion engine has the advantage (5) of the second embodiment in addition to the advantage (1) of the first embodiment and the advantages (7) and (8) of the fourth embodiment.

Sixth Embodiment

A sixth embodiment of an air cleaner 10 will now be described focusing on the differences from the fourth embodiment with reference to FIG. 12.

Figure 12:
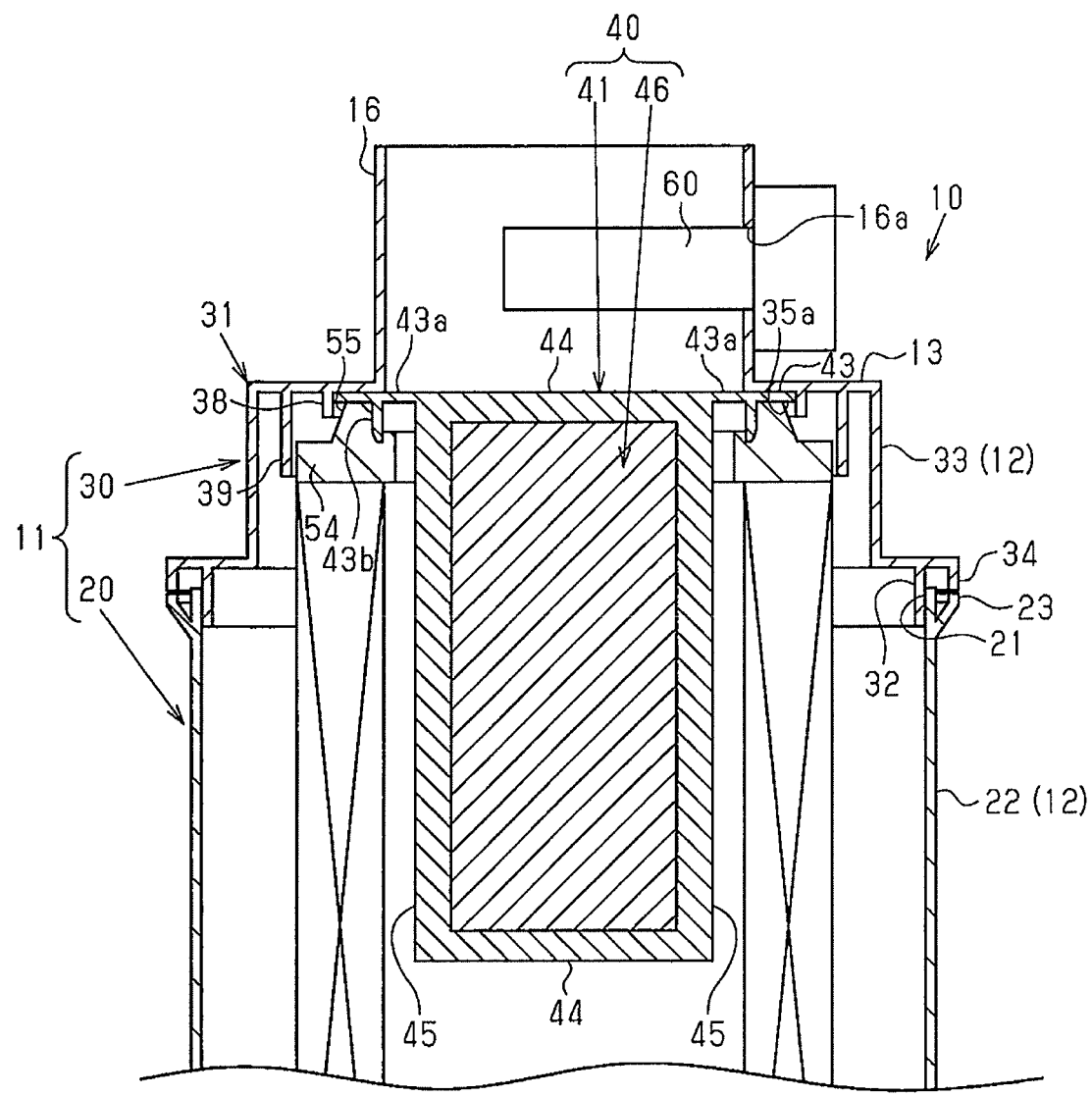
FIG. 12 is a cross-sectional view showing a sixth embodiment of a tubular air cleaner including a cross-sectional structure of an adsorbent filter assembly and an airflow meter.

As shown in FIG. 12, the outlet 16 includes the attachment slot 16a used for attachment of the airflow meter 60, which detects the intake air amount of the internal combustion engine.

In the sixth embodiment, the adsorbent filter 46 is arranged parallel to the projection direction of the airflow meter 60, which projects through the attachment slot 16a into the outlet 16.

The sixth embodiment of the tubular air cleaner for an internal combustion engine has the advantage (6) of the third embodiment in addition to the advantage (1) of the first embodiment and the advantages (7) and (8) of the fourth embodiment.

Seventh Embodiment

A seventh embodiment will now be described with reference to FIGS. 13 to 17.

The seventh embodiment differs from the first embodiment in the structures of the first sealing portion 52 of the filter element 50, the case 20, and the cap 30. Hereafter, the description will focus on the differences from the first embodiment. The same reference characters are given to those elements that are the same as or correspond to the first embodiment. Such elements will not be described in detail.

Filter Element 50

Figure 13:
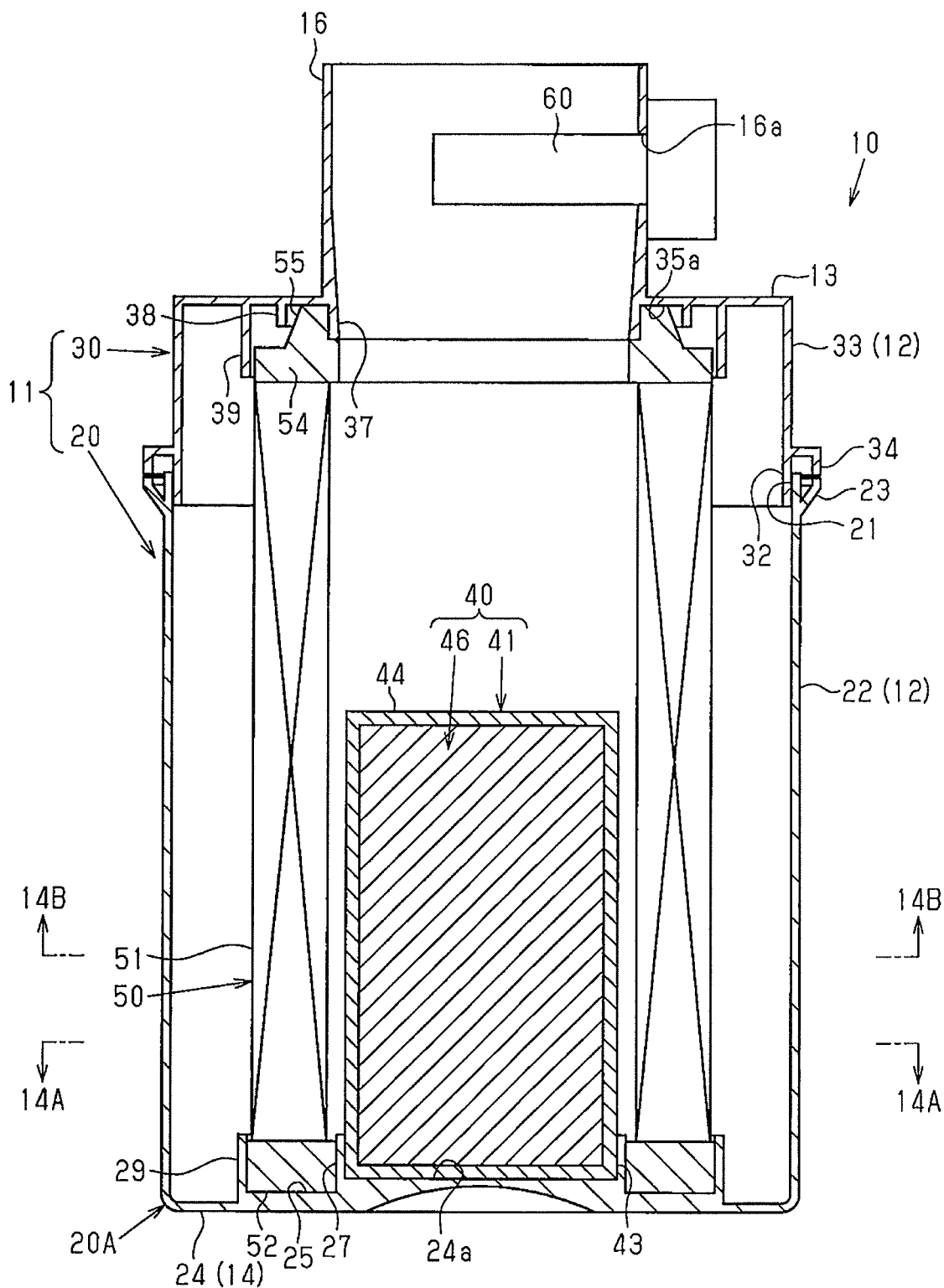
FIG. 13 is a vertical cross-sectional view showing a seventh embodiment of a tubular air cleaner.

As shown in FIG. 13, the first sealing portion 52 includes a planar end surface that is orthogonal to the axis.

Case 20

Figure 14A:
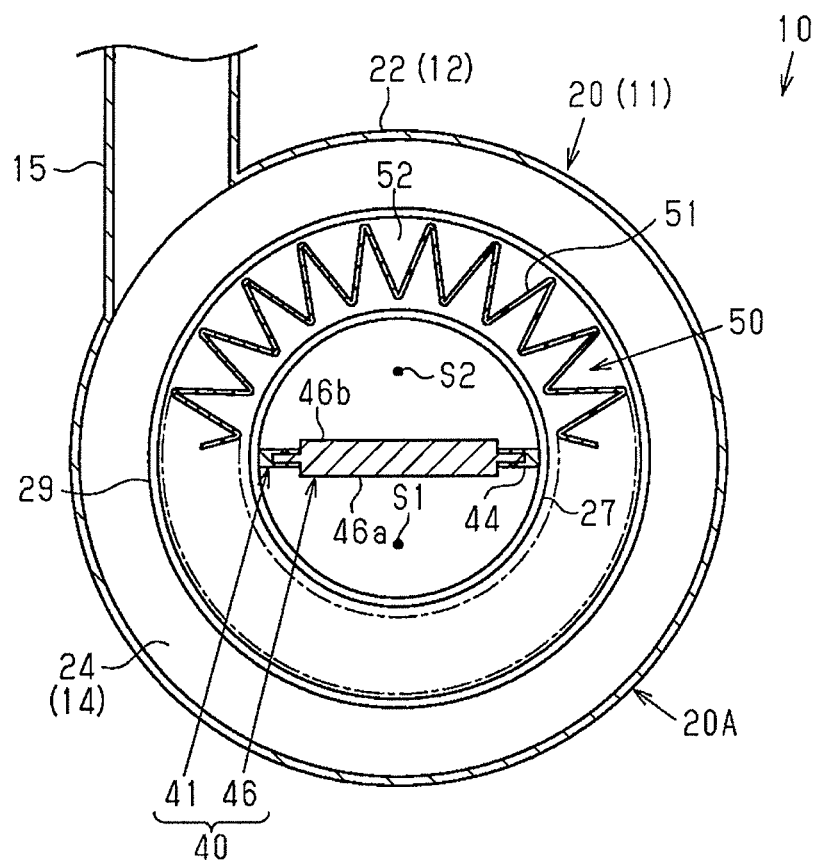
FIG. 14A is a cross-sectional view taken along line 14A-14A in FIG. 13.
Figure 14B:
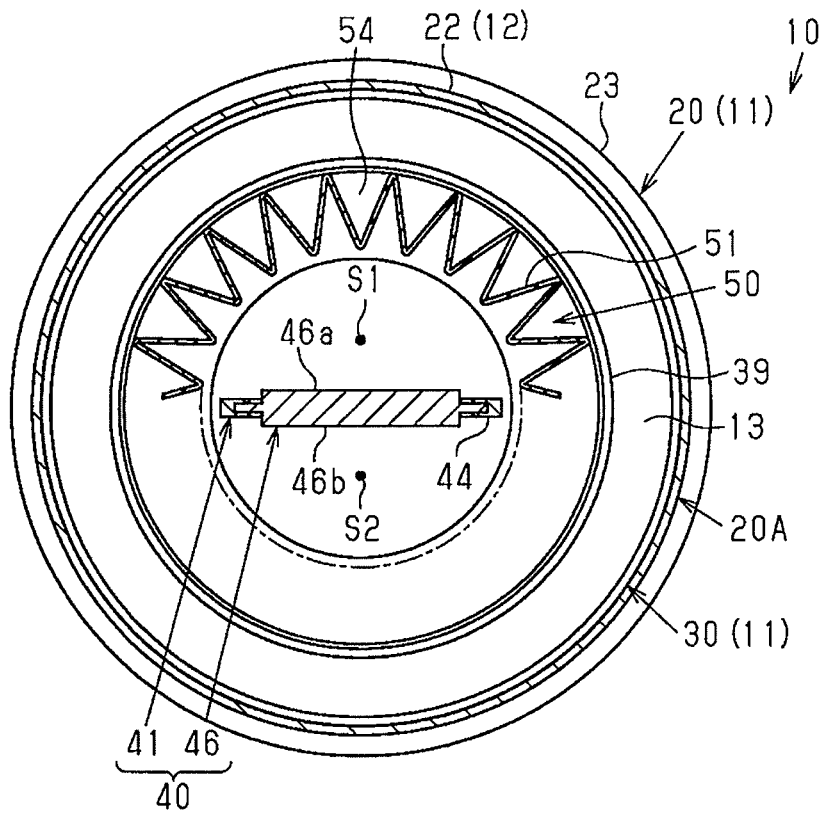
FIG. 14B is a cross-sectional view taken along line 14B-14B in FIG. 13.

As shown in FIGS. 13, 14A, and 14B, the case 20 includes a case body 20A and the adsorbent filter assembly 40.

The case body 20A includes the tubular case circumferential wall 22, which extends around the opening 21.

Figure 15:
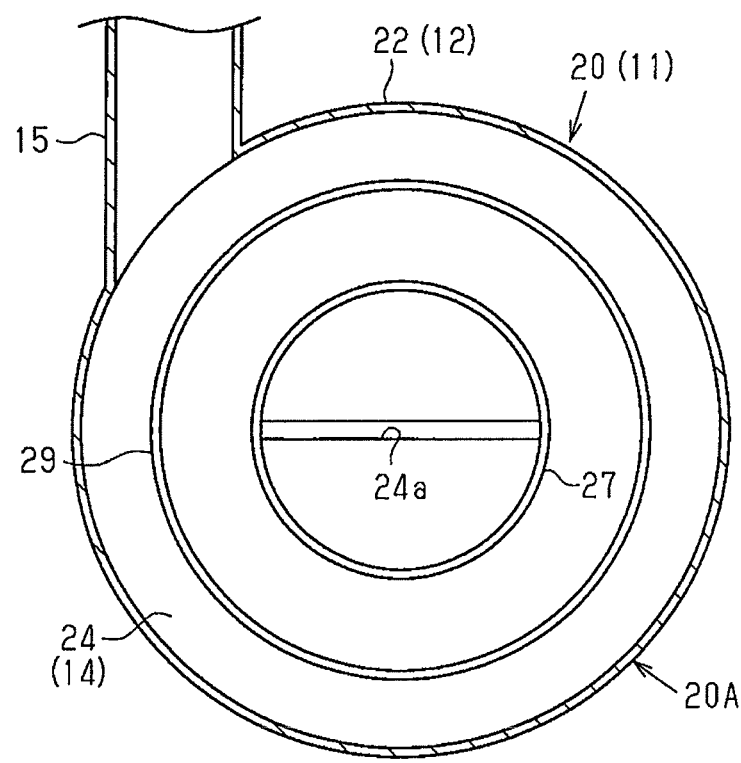
FIG. 15 is a cross-sectional view corresponding to FIG. 14A showing a case body with the adsorbent filter assembly removed.

As shown in FIGS. 13, 14A, and 15, the case body 20A includes a case bottom wall 24, which defines the bottom wall 14 of the housing 11, and the tubular inlet 15, which projects from an outer surface of the case circumferential wall 22 and communicates the inside of the case 20 to the outside of the case 20.

The inner surface of the case bottom wall 24 includes an inner projection 27 and an outer projection 29, which are annular and concentric with each other about the axis of the case body 20A. The inner surface of the case bottom wall 24, the outer circumferential surface of the inner projection 27, and the inner circumferential surface of the outer projection 29 define an annular recess 25. The first sealing portion 52 of the filter element 50 is fitted into the recess 25. The first sealing portion 52 includes an end surface that contacts the inner surface of the case bottom wall 24 in the recess 25. This seals the space between the case 20 and the first sealing portion 52.

As shown in FIGS. 13 and 15, an insertion recess 24a is formed in a portion of the inner surface of the case bottom wall 24 located at an inner side of the inner projection 27. The insertion recess 24a radially extends through the axis of the case body 20A. The adsorbent filter assembly 40 includes a basal end portion inserted into and fixed to the insertion recess 24a and will be described later.

As shown in FIGS. 13, 14A, and 14B, the adsorbent filter assembly 40 includes the adsorbent filter 46 and a holding member 41, which holds the adsorbent filter 46 and is inserted into and fixed to the insertion recess 24a of the case body 20A.

Figure 16:
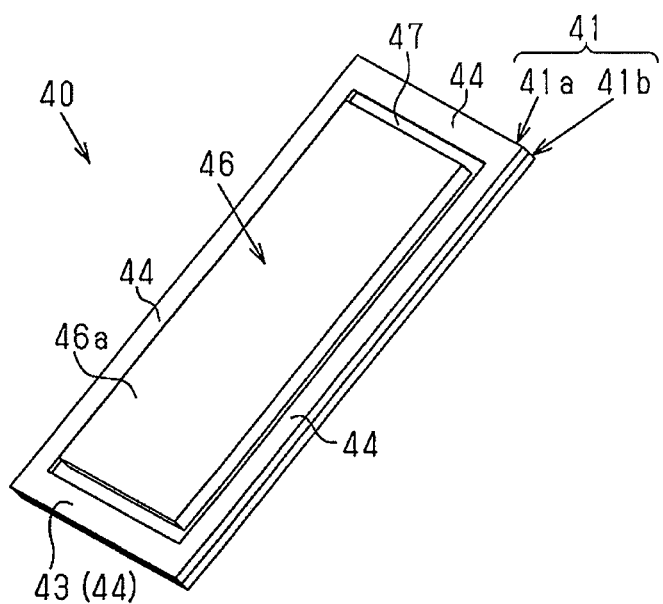
FIG. 16 is a perspective view showing an adsorbent filter assembly of the seventh embodiment.

As shown in FIGS. 13 and 16, the holding member 41 of the seventh embodiment includes the looped rectangular frame 44.

Figure 17:
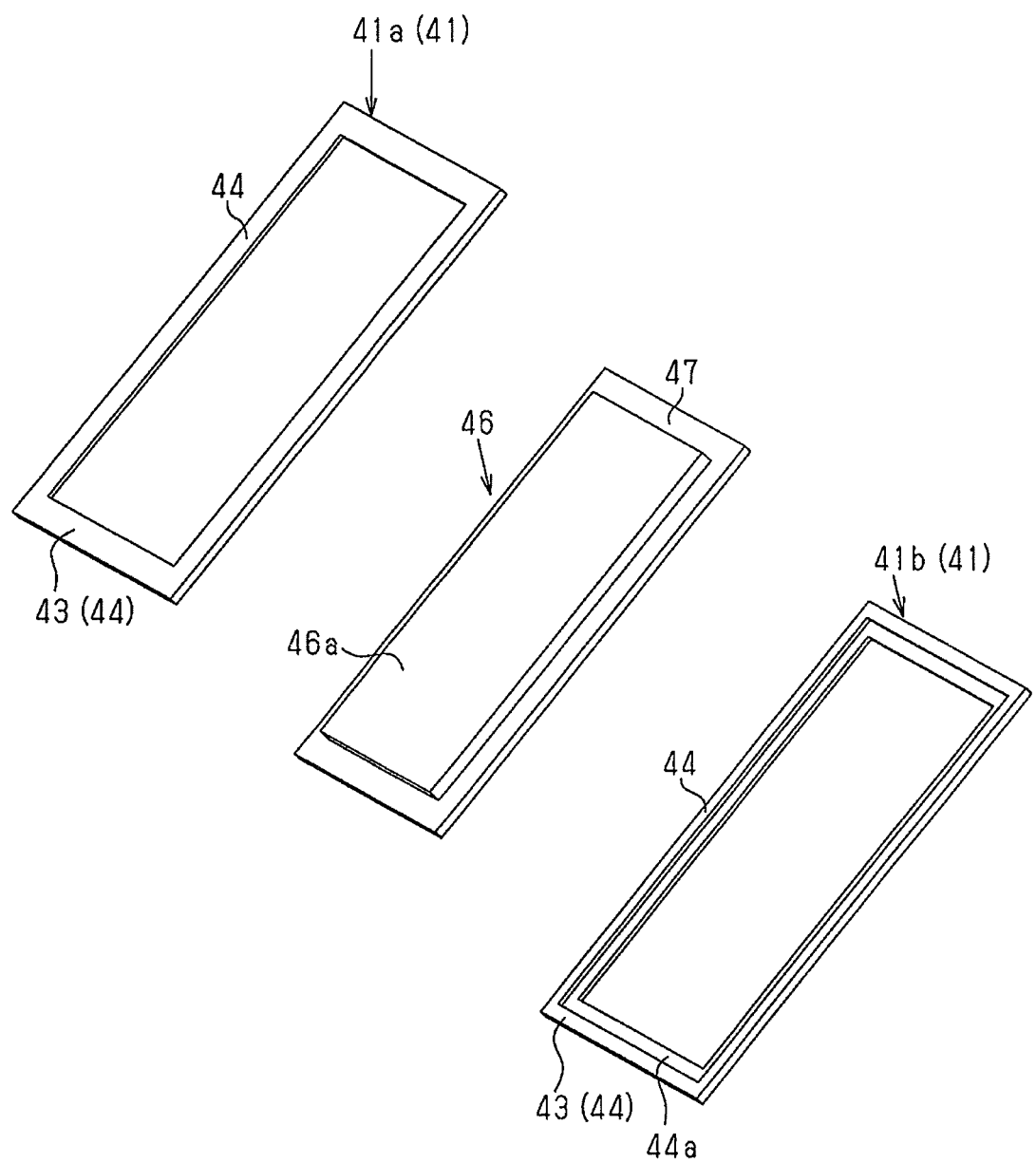
FIG. 17 is an exploded perspective view separately showing a first half body, a second half body, and an adsorbent filter that form the adsorbent filter assembly of the seventh embodiment.

As shown in FIGS. 16 and 17, the holding member 41 of the seventh embodiment includes a first half body 41a and a second half body 41b, which are formed separately from each other from a rigid resin material.

As shown in FIG. 17, the half bodies 41a, 41b have surfaces opposed to each other, each of which includes the accommodation portion 44a. The accommodation portion 44a entirely extends around the inner periphery of the corresponding one of the half bodies 41a, 41b to accommodate the peripheral edge portion 47 of the adsorbent filter 46.

With the peripheral edge portion 47 of the adsorbent filter 46 held between the accommodation portions 44a of the half bodies 41a, 41b, the half bodies 41a, 41b are bonded to each other, for example, through vibration welding. This forms the adsorbent filter assembly 40.

As shown in FIG. 13, the holding member 41 includes a basal end portion (portion of frame 44 and may be referred to as fixing portion 43) that is inserted into the insertion recess 24a and fixed to the case bottom wall 24. The fixing portion 43 and the case bottom wall 24 are bonded to each other, for example, through vibration welding.

Cap 30

As shown in FIG. 13, the cap 30 includes the tubular cap circumferential wall 33, which extends around the opening 32, a top wall 13, and the tubular outlet 16, which projects from the outer surface of the top wall 13 to communicate the inside of the cap 30 to the outside of the cap 30.

The inner surface of the top wall 13 includes an inner projection 37, an intermediate projection 38, and an outer projection 39, which are annular and concentric with each other about the axis of the cap 30. The inner surface of the top wall 13, the outer circumferential surface of the inner projection 37, and the inner circumferential surface of the intermediate projection 38 define an annular recess 35a. The annular projection 55 of the second sealing portion 54 of the filter element 50 is fitted into the recess 35a. The end surface of the annular projection 55 contacts an inner surface (hereafter, may be referred to as sealing surface) of the top wall 13 in the recess 35a. This seals the space between the cap 30 and the second sealing portion 54.

As shown in FIGS. 13 and 14B, the adsorbent filter 46 extends through the axis of the filter element 50 in the axial direction of the filter element 50. The distal end of the adsorbent filter assembly 40 is located in the case 20.

As shown in FIGS. 14A and 14B, the inner surface of the filter portion 51 of the filter element 50 is spaced apart from the opposite planes 46a, 46b of the adsorbent filter 46 by the gaps S1, S2, which allow air to reach the outlet 16 without passing through the adsorbent filter 46.

As shown in FIG. 13, the adsorbent filter 46 is arranged parallel to the projection direction of the airflow meter 60, which projects through the attachment slot 16a into the outlet 16.

The seventh embodiment of the tubular air cleaner for an internal combustion engine has the advantages described below in addition to the advantage (1) of the first embodiment and the advantage (6) of the third embodiment.

(9) The housing 11 includes the case 20, which includes the bottom wall 14, and the cap 30, which includes the top wall 13 and is coupled to the case 20 in a removable manner. The basal end portion of the adsorbent filter 46 is fixed to the inner surface of the bottom wall 14.

In this structure, the adsorbent filter 46 is coupled to the bottom wall 14 of the case 20. Thus, the same case 20 may be used with caps that include outlets 16 having different diameters. This commonalizes the case 20.

(10) The distal end of the adsorbent filter 46 is located in the case 20. More specifically, the adsorbent filter 46 does not extend into the cap 30. Thus, the disturbance of air flow caused by the adsorbent filter 46 is further reduced.

(11) The case 20 includes the case body 20A, which includes the bottom wall 14, and the adsorbent filter assembly 40, which includes the adsorbent filter 46 and the fixing portion 43 formed integrally with the adsorbent filter 46. The fixing portion 43 is fixed to the inner surface of the bottom wall 14.

In this structure, the adsorbent filter assembly 40 includes the adsorbent filter 46 and the fixing portion 43, and the case body 20A includes the bottom wall 14. Thus, when the air cleaner 10 is destined for a location that requires the adsorbent filter 46, the case body 20A to which the adsorbent filter assembly 40 is coupled to is used as the case. When the air cleaner 10 is destined for a location that does not require the adsorbent filter 46, the adsorbent filter assembly 40 is not coupled to the case body 20A. That is, only the case body 20A may be used as the case. This simplifies the structure of the adsorbent filter assembly 40. Also, the case body 20A is commonalized regardless of whether or not the adsorbent filter 46 is coupled to.

Eighth Embodiment

An eighth embodiment of an adsorbent filter assembly 40 will now be described focusing on the differences from the seventh embodiment with reference to FIG. 18.

Figure 18:
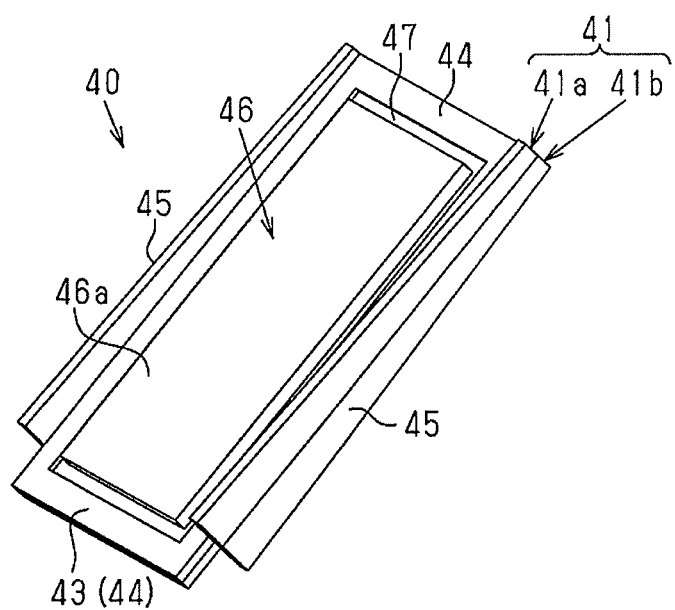
FIG. 18 is a perspective view showing an eighth embodiment of an adsorbent filter assembly.
Figure 19:
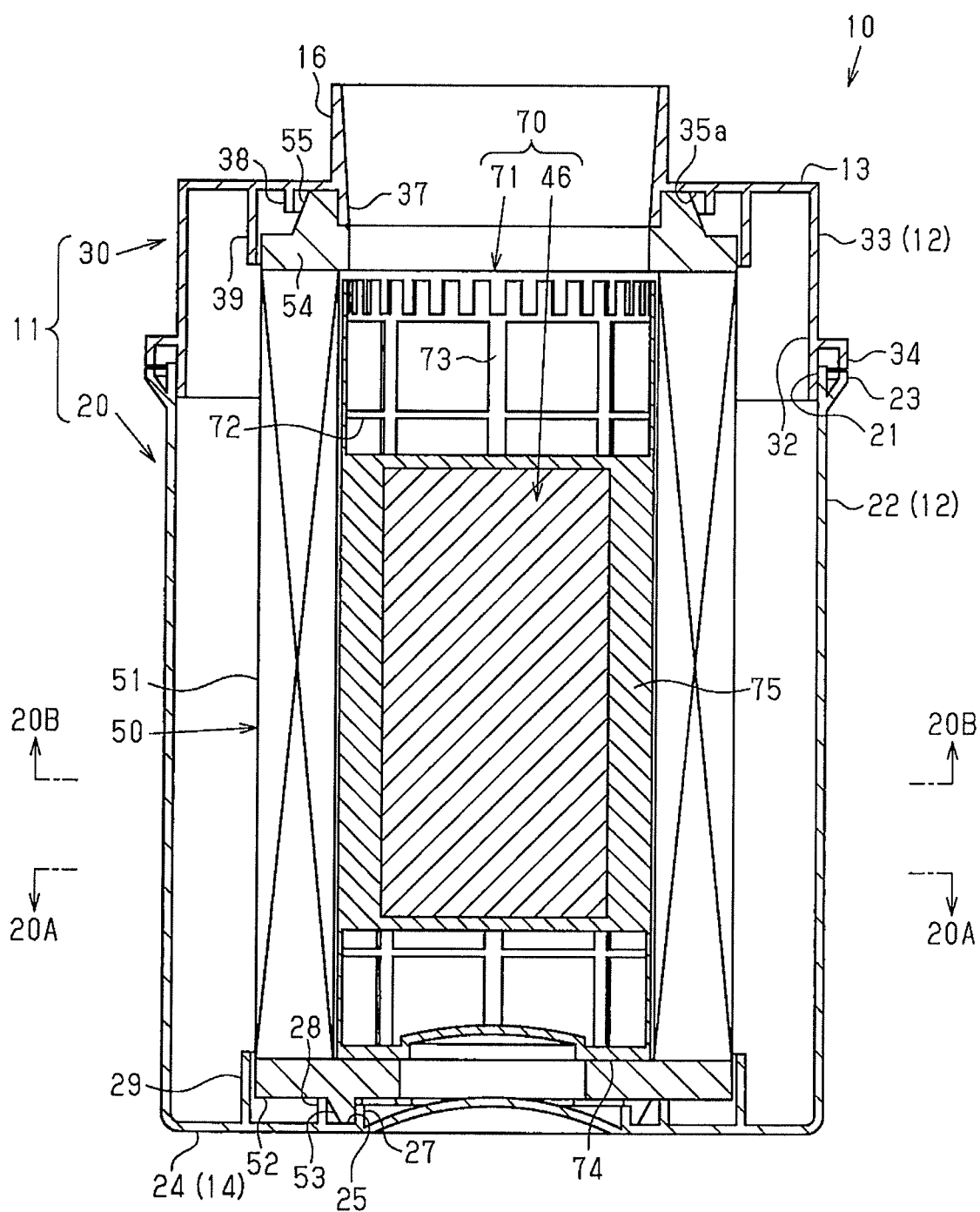
FIG. 19 is a vertical cross-sectional view showing a ninth embodiment of a tubular air cleaner.

As shown in FIG. 18, the frame 44 includes two pillars 45, which extend in the axial direction of the filter element 50, at portions that are not inserted into the insertion recess 24*a*. The width of each pillar 45 is tapered toward the distal side, which is distant from the fixing portion 43. The basal end of each pillar 45 is fixed to the inner surface of the case body 20A.

The eighth embodiment of the tubular air cleaner for an internal combustion engine has the advantages described below in addition to the advantage (1) of the first embodiment and the advantages (9) through (11) of the seventh embodiment.

(12) The adsorbent filter assembly 40 includes the frame 44, which is arranged on the periphery of the adsorbent filter 46. The frame 44 includes the two pillars 45 extending in the axial direction of the filter element 50 and having a width tapered toward the distal side, which is distant from the fixing portion 43.

With this structure, the width of the two pillars 45 of the frame 44 is tapered toward the distal side. Thus, when the adsorbent filter assembly 40 fixed to the case body 20A is inserted into the filter element 50, the interference with the pillars 45 is limited. This allows the case 20 to be easily coupled to the cap 30 to which the filter element 50 is coupled.

Additionally, the pillars 45 are wider toward the basal side. This increases the rigidity of the pillars 45, and ultimately, the rigidity of the adsorbent filter 46.

Additionally, as compared to a structure in which the entire width of each pillar 45 is large and constant in conformance with the width of the basal side, the pillars 45 of the eighth embodiment reduce the disturbance of the flow of air flowing through the inner side of the filter element 50. Thus, the air pressure loss is reduced.

Ninth Embodiment

A ninth embodiment will now be described with reference to FIGS. 19 to 22.

The ninth embodiment differs from the first embodiment in that a substantially tubular framework 71 is located at an inner side of the filter portion 51 of the filter element 50 to maintain the shape of the filter portion 51. Additionally, the structure of the cap 30 differs from that of the first embodiment. The cap 30 of the ninth embodiment basically has the same structure as that of the seventh embodiment (refer to FIG. 19). Hereafter, the description will focus on the differences from the first embodiment. The same reference characters are given to those elements that are the same as or correspond to the first embodiment. Such elements will not be described in detail.

Adsorbent Filter Assembly 70

As shown in FIGS. 19, 20A, 20B, and 21, an adsorbent filter assembly 70 includes the framework 71 and the adsorbent filter 46, which is fixed to the framework 71 to adsorb evaporated fuel of the internal combustion engine.

The framework 71 includes a plurality of rings 72, which are arranged at intervals in the axial direction with the centers aligned with the axis of the filter portion 51, a plurality of straight portions 73, which extend along the axis of the filter portion 51 and connect the rings 72, and a bottom portion 74, which is located at one end in the axial direction and includes a center hole. The bottom portion 74 is connected to one end of each straight portion 73.

Two looped rectangular holding portions 75 are coupled to an inner side of the framework 71.

Figure 22:
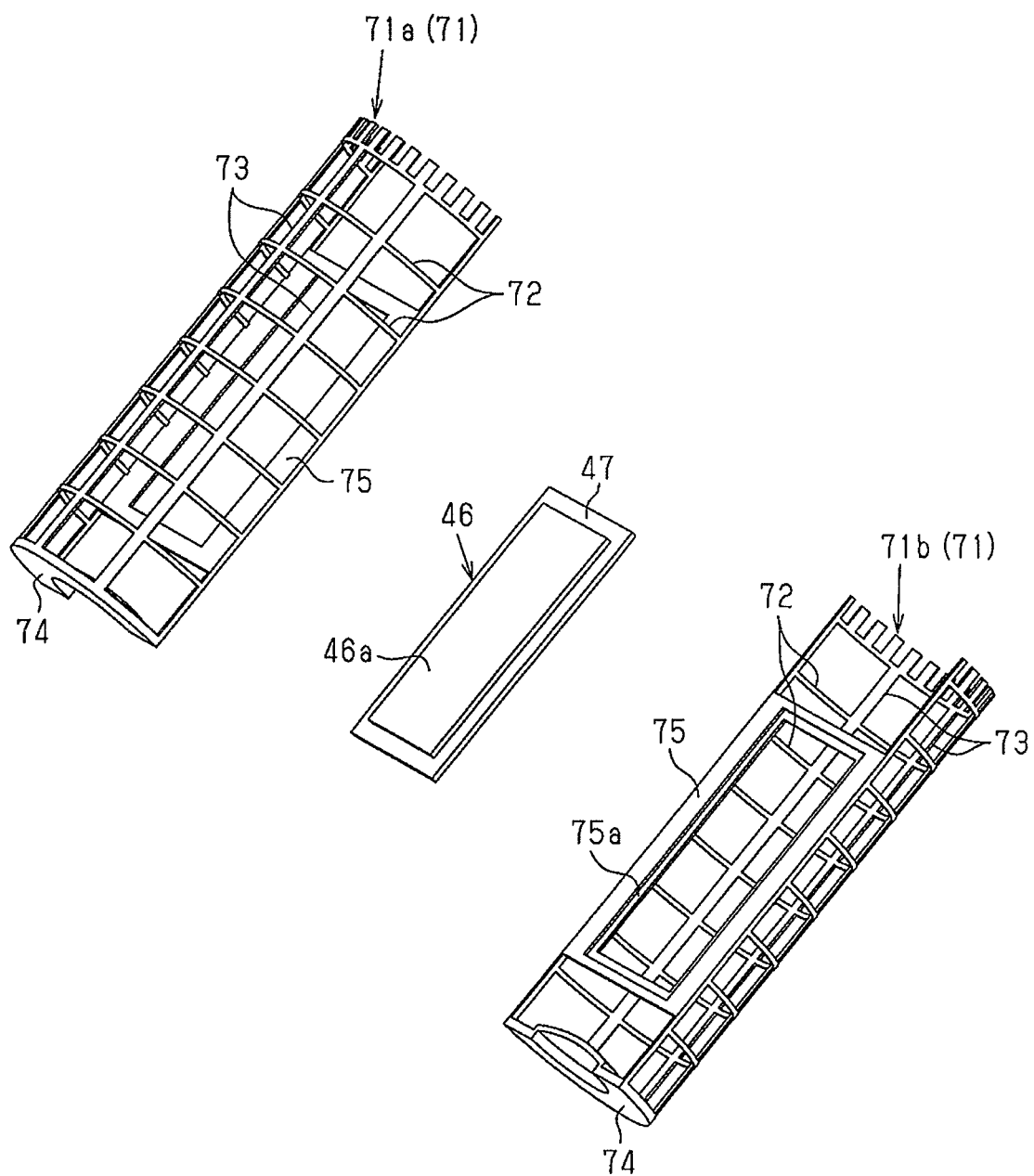
FIG. 22 is an exploded perspective view separately showing a first tubular half body, a second tubular half body, and an adsorbent filter that form the adsorbent filter assembly of the ninth embodiment.

As shown in FIG. 22, the framework 71 of the ninth embodiment including the holding portions 75 includes a first half tubular body 71*a* and a second half tubular body 71*b*, which are formed separately from each other from a rigid resin material. The half tubular bodies 71*a*, 71*b* have surfaces opposed to each other, each of which includes an accommodation portion 75*a*. The accommodation portion 75*a* entirely extends around the inner periphery of the corresponding one of the half tubular bodies 71*a*, 71*b* to accommodate the peripheral edge portion 47 of the adsorbent filter 46.

With the peripheral edge portion 47 of the adsorbent filter 46 held between the accommodation portions 75*a* of the half tubular bodies 71*a*, 71*b*, the half tubular bodies 71*a*, 71*b* are bonded to each other, for example, through vibration welding. This forms the adsorbent filter assembly 70.

Figure 20A:
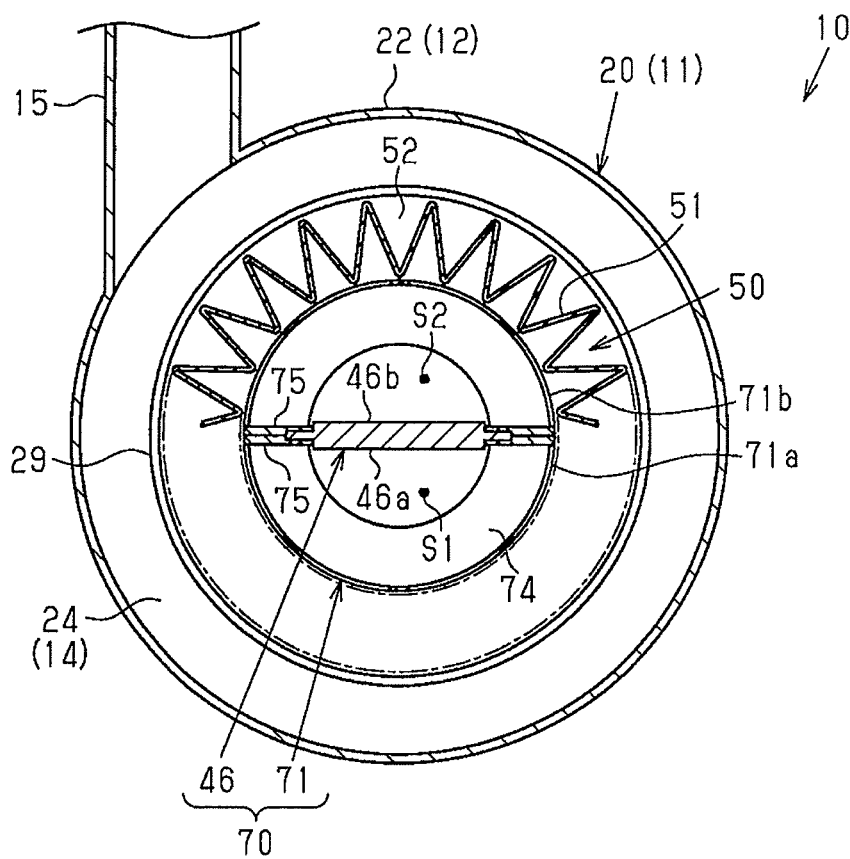
FIG. 20A is a cross-sectional view taken along line 20A-20A in FIG. 19.
Figure 20B:
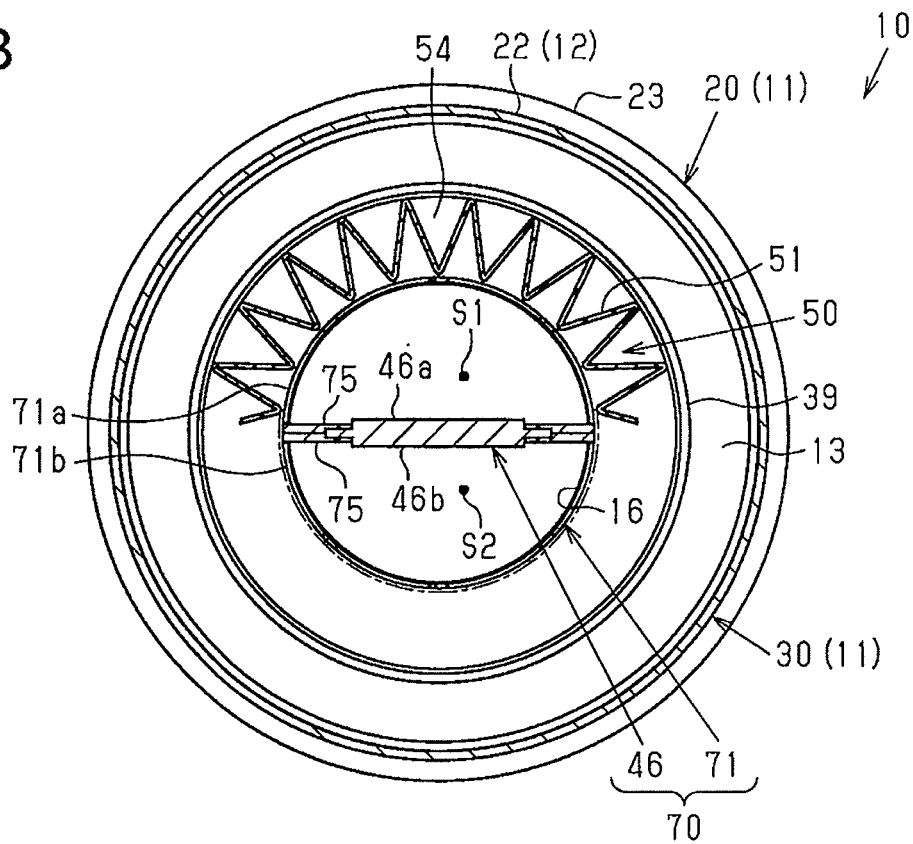
FIG. 20B is a cross-sectional view taken along line 20B-20B in FIG. 19.
Figure 21:
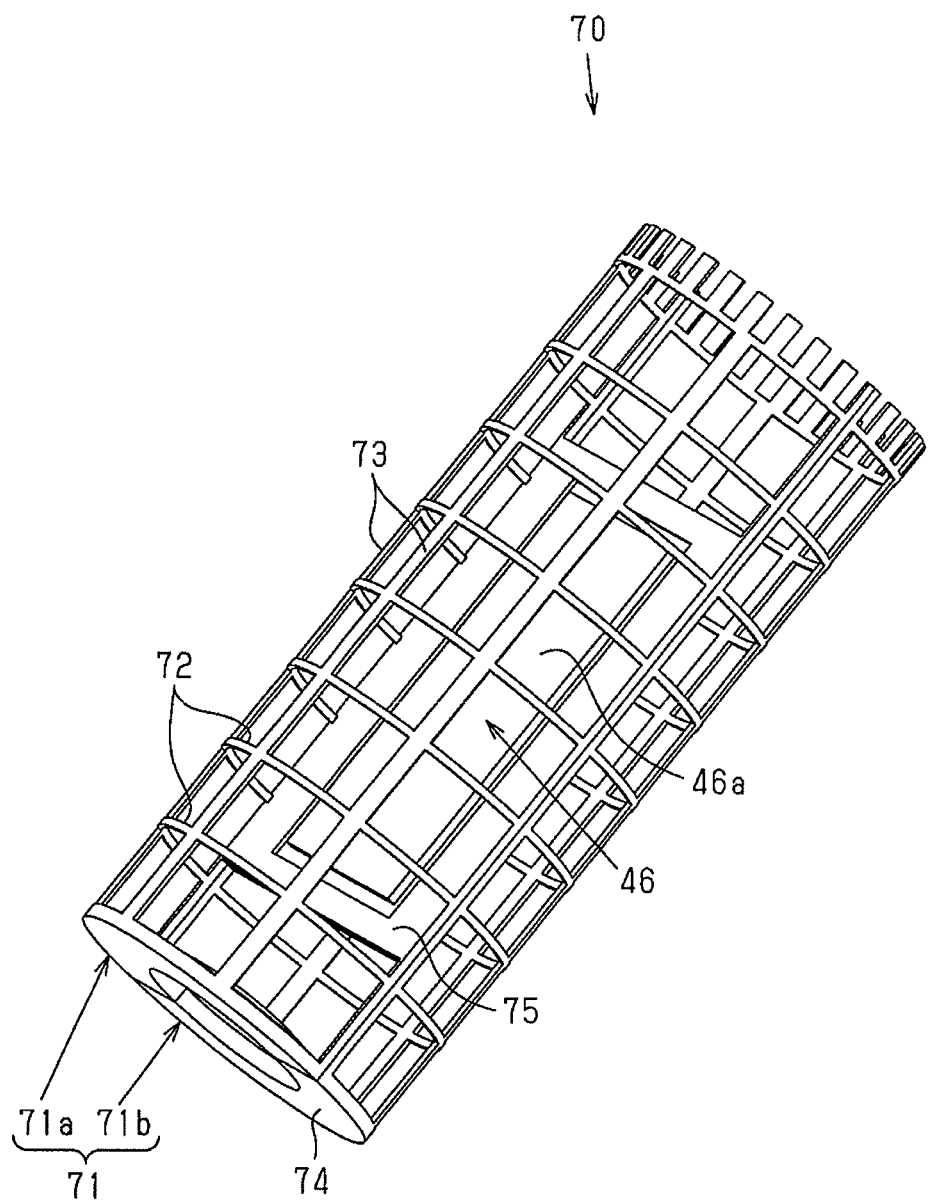
FIG. 21 is a perspective view showing an adsorbent filter assembly of the ninth embodiment.

As shown in FIGS. 20A and 20B, the inner surface of the filter portion 51 of the filter element 50 is spaced apart from the opposite planes 46*a*, 46*b* of the adsorbent filter 46 by gaps S1, S2. The gaps S1, S2 allow air to reach the outlet 16 without passing through the adsorbent filter 46.

Opposite ends of the framework 71 in the axial direction are sandwiched between and fixed to the first sealing portion 52 and the second sealing portion 54.

The ninth embodiment of the tubular air cleaner for an internal combustion engine has the advantages described below.

(13) The framework 71 is located at the inner side of the filter portion 51 to maintain the shape of the filter portion 51. The planar adsorbent filter 46, which adsorbs evaporated fuel of the internal combustion engine, is fixed to the framework 71. The adsorbent filter 46 extends in the axial direction of the filter portion 51. The inner surface of the filter portion 51 is spaced apart from the opposite planes 46*a*, 46*b* of the adsorbent filter 46 by the gaps S1, S2, which allow air to reach the outlet 16 without passing through the adsorbent filter 46.

With this structure, when air flows through the filter portion 51 of the filter element 50 into the inner side of the filter element 50, the air is allowed to reach the outlet 16 without passing through the adsorbent filter 46. Thus, when air flows through the inner side of the filter element 50, an increase in the flow resistance caused by the adsorbent filter 46 will be limited. Consequently, the air pressure loss is reduced.

Additionally, in the above structure, the adsorbent filter 46 is fixed to the framework 71, which maintains the shape of the filter portion 51. Thus, the adsorbent filter 46 may be replaced together with the filter element 50.

The adsorbent filter 46 may be set to any position in the axial direction of the filter portion 51. This increases the degree of freedom for arranging the adsorbent filter 46.

Additionally, the conventional case 20 and the conventional cap 30 may be used.

(14) The framework 71 includes the two half tubular bodies 71a, 71b. Each of the half tubular bodies 71a, 71b includes the holding portion 75, which holds the peripheral edge portion 47 of the adsorbent filter 46.

With this structure, when the peripheral edge portion 47 of the adsorbent filter 46 is held between the holding portions 75 of the two half tubular bodies 71a, 71b, the adsorbent filter 46 may be easily fixed to the framework 71.

(15) The holding portions 75 entirely extend around the adsorbent filter 46.

With this structure, the peripheral edge portion 47 of the adsorbent filter 46 is entirely held between the holding portions 75. Thus, the adsorbent filter 46 is assuredly fixed to the framework 71.

(16) The tubular filter element 50 includes the tubular filter portion 51 and is accommodated in the housing of an internal combustion engine air cleaner. The framework 71 is arranged at an inner side of the filter portion 51 to maintain the shape of the filter portion 51. The planar adsorbent filter 46, which adsorbs evaporated fuel of the internal combustion engine, is fixed to the framework 71. The adsorbent filter 46 extends in the axial direction of the filter portion 51. The inner surface of the filter portion 51 is spaced apart from the opposite planes 46a, 46b of the adsorbent filter 46 by gaps that allow air to flow out without passing through the adsorbent filter 46.

With this structure, the same advantage as the advantage (13) may be obtained.

MODIFIED EXAMPLES

Each embodiment may be modified as follows.

The layer structure of the adsorbent filter 46 may be changed, for example, by omitting the glass fiber nets. The material forming the adsorbent layer only needs to adsorb evaporated fuel. Thus, an adsorbent differing from activated carbon such as zeolite may be used.

The adsorbent filter 46 may be arranged so as not to extend through the axis of the filter element 50.

The adsorbent filter 46 may be inclined from the axial direction of the filter element 50.

The shape of the adsorbent filter 46 may be changed from the rectangular plate to, for example, a trapezoidal plate.

In the same manner as the first embodiment, the second embodiment of the pillars 45 of the adsorbent filter assembly 40 may each have a width tapered toward the distal side, which is distant from the fixing portion 43. The fifth embodiment may be modified in the same manner.

Instead of the first embodiment, when the tubular portion 42 of the adsorbent filter assembly 40 is inserted through the through hole 36 of the cap top wall 35, the fixing portion 43 may be fixed to the inner surface of the cap top wall 35 of the cap body 31. In this case, the inner projection 37 is omitted from the cap top wall 35. Additionally, as in the fourth embodiment, the inner surface of the fixing portion 43 includes the inner projection 43b.

In the seventh embodiment, the process for fixing the fixing portion 43 of the adsorbent filter assembly 40 to the case bottom wall 24 of the case body 20A is not limited to vibration welding. For example, adhesion or snap-fit may be used.

In the seventh and eighth embodiments, the adsorbent filter assembly 40 may include an annular fixing portion. In this case, the circumference of the annular fixing portion is entirely fixed to the inner surface of the case bottom wall 24 of the case body 20A. Thus, the adsorbent filter assembly 40 is stably fixed to the case body 20A.

In the seventh and eighth embodiments, when the adsorbent filter 46 has a high rigidity, the adsorbent filter 46 may be directly fixed to the case bottom wall 24 of the case body 20A.

In the seventh and eighth embodiments, the distal end of the adsorbent filter 46 may extend into the cap 30.

In the ninth embodiment, the holding portions 75 may hold only one, two, or three sides of the four sides of the peripheral edge portion 47 of the adsorbent filter 46.

In the ninth embodiment, the adsorbent filter 46 may be fixed to the framework 71 through adhesion.

When the holding member 41 is molded from a resin, the adsorbent filter 46 may be inserted so that the holding member 41 and the adsorbent filter 46 are formed integrally with each other.

When the framework 71 is molded from a resin, the adsorbent filter 46 may be inserted so that the framework 71 and the adsorbent filter 46 are formed integrally with each other.

The invention claimed is:

1. A tubular air cleaner arranged in an intake air passage of an internal combustion engine, the tubular air cleaner comprising:
   a tubular housing including a circumferential wall including an inlet, a top wall including an outlet, and a bottom wall opposed to the top wall;
   a tubular filter element accommodated in the housing; and
   a planar adsorbent filter located at an inner side of the filter element to adsorb evaporated fuel of the internal combustion engine, wherein
   the adsorbent filter extends in an axial direction of the filter element, and
   the filter element includes an inner surface spaced apart from each of opposite planes of the adsorbent filter by a gap that allows air, which has flowed through the filter element into the inner side of the filter element, to reach the outlet without passing through the adsorbent filter.

2. A tubular air cleaner arranged in an intake air passage of an internal combustion engine, the tubular air cleaner comprising:
   a tubular housing including a circumferential wall including an inlet, a top wall including an outlet, and a bottom wall opposed to the top wall;
   a tubular filter element accommodated in the housing; and
   a planar adsorbent filter located at an inner side of the filter element to adsorb evaporated fuel of the internal combustion engine, wherein
   the adsorbent filter extends in an axial direction of the filter element, and
   the filter element includes an inner surface spaced apart from each of opposite planes of the adsorbent filter by a gap that allows air, which has flowed through the filter element into the inner side of the filter element, to reach the outlet without passing through the adsorbent filter, wherein
   the housing includes a case including the bottom wall and a cap including the top wall and coupled to the case in a removable manner, the cap includes a cap body and an adsorbent filter assembly, the cap body includes a cap top wall including a through hole, the adsorbent filter assembly includes a tubular portion defining the outlet, the adsorbent filter, and a fixing portion formed integrally with the tubular portion and the adsorbent filter, and when one of the adsorbent filter and the tubular portion is inserted through the through hole, the fixing portion is fixed to the cap top wall.

3. The tubular air cleaner according to claim 2, wherein the cap top wall of the cap body includes an outer surface to which the fixing portion of the adsorbent filter assembly is fixed.

4. The tubular air cleaner according to claim 2, wherein the fixing portion is annular and includes a circumference that is entirely fixed to the cap top wall.

5. The tubular air cleaner according to claim 2, wherein
the adsorbent filter assembly includes a frame arranged on a periphery of the adsorbent filter, the frame includes two pillars extending in the axial direction of the filter element, and each of the two pillars has a width tapered toward a distal side, which is distant from the fixing portion.

6. The tubular air cleaner according to claim 2, wherein
the outlet includes an attachment slot used for attachment of an airflow meter, which detects an intake air amount, the airflow meter projects through the attachment slot into the outlet, and the adsorbent filter is arranged parallel to a projection direction of the airflow meter.

\* \* \* \* \*